United States Patent
Bemment et al.

(10) Patent No.: US 12,331,685 B2
(45) Date of Patent: Jun. 17, 2025

(54) FUEL VISCOSITY

(71) Applicant: ROLLS-ROYCE plc, London (GB)

(72) Inventors: Craig W Bemment, Derby (GB); Alastair G Hobday, Derby (GB); Benjamin J Keeler, Chesterfield (GB); Christopher P Madden, Derby (GB); Andrea Minelli, Derby (GB); Andrew T Smith, Derby (GB); Peter Swann, Derby (GB); Martin K Yates, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/634,305

(22) Filed: Apr. 12, 2024

(65) Prior Publication Data

US 2024/0263582 A1 Aug. 8, 2024

Related U.S. Application Data

(63) Continuation of application No. 18/337,516, filed on Jun. 20, 2023, now Pat. No. 11,988,144.

(30) Foreign Application Priority Data

Dec. 21, 2022 (GB) ...................................... 2219425

(51) Int. Cl.
*F02C 7/14* (2006.01)
*F02C 7/224* (2006.01)
*F02C 7/36* (2006.01)

(52) U.S. Cl.
CPC ................ *F02C 7/14* (2013.01); *F02C 7/224* (2013.01); *F02C 7/36* (2013.01); *F05D 2220/323* (2013.01); *F05D 2260/213* (2013.01)

(58) Field of Classification Search
CPC .... F02C 7/14; F02C 7/224; F02C 7/36; F02C 7/16; F01D 25/18; B64D 37/34; F05D 2220/323; F05D 2260/213
See application file for complete search history.

(56) References Cited

U.S. PATENT DOCUMENTS

| | | |
|---|---|---|
| 4,354,345 A | 10/1982 | Dreisbach, Jr. et al. |
| 8,261,527 B1 | 9/2012 | Stearns et al. |
| 11,549,399 B2 | 1/2023 | Dolman et al. |

(Continued)

FOREIGN PATENT DOCUMENTS

| | | |
|---|---|---|
| CN | 112082174 A | 12/2020 |
| EP | 2807341 B1 | 7/2020 |

(Continued)

*Primary Examiner* — Todd E Manahan
*Assistant Examiner* — Rodolphe Andre Chabreyrie
(74) *Attorney, Agent, or Firm* — Oliff PLC

(57) ABSTRACT

A method of operating a gas turbine engine including an engine core including a turbine, compressor, combustor to combust a fuel, and core shaft connecting the turbine and compressor; a fan upstream of the engine core; a fan shaft; a gearbox that receives an input from the core shaft and outputs drive to the fan via the fan shaft; a primary oil loop system to supply oil to the gearbox; and a heat exchange system. The method includes controlling the heat exchange system to adjust fuel viscosity to be lower than or equal to 0.58 mm$^2$/s on entry to the combustor at cruise conditions.

18 Claims, 13 Drawing Sheets

(56) References Cited

U.S. PATENT DOCUMENTS

| | | | |
|---|---|---|---|
| 2008/0110596 A1* | 5/2008 | Schwarz | F01D 25/08 |
| | | | 165/104.11 |
| 2012/0085528 A1 | 4/2012 | Schwarz et al. | |
| 2014/0090387 A1 | 4/2014 | John et al. | |
| 2015/0292409 A1 | 10/2015 | Logan et al. | |
| 2017/0159569 A1 | 6/2017 | Miller et al. | |
| 2019/0170016 A1 | 6/2019 | Stearns et al. | |
| 2020/0291817 A1* | 9/2020 | Leque | F01M 11/064 |
| 2021/0172375 A1* | 6/2021 | Bosak | B64D 33/08 |
| 2022/0381186 A1* | 12/2022 | Adique | F02C 9/26 |
| 2023/0140527 A1 | 5/2023 | Sandberg et al. | |

FOREIGN PATENT DOCUMENTS

| | | | |
|---|---|---|---|
| FR | 3140131 A1 | 3/2024 | |
| FR | 3140132 A1 | 3/2024 | |

* cited by examiner

FUEL VISCOSITY

CROSS-REFERENCE TO RELATED APPLICATIONS

This application is a continuation of U.S. Ser. No. 18/337,516, filed on 20 Jun. 2023, which claims priority from UK Patent Application Number 2219425.2 filed on 21 Dec. 2022, the entire contents of the prior applications being incorporated herein by reference.

BACKGROUND

Field of the Disclosure

The present disclosure relates to aircraft propulsions systems, and to methods of operating aircraft involving the management of different fluids and heat transfer therebetween, and in particular to management of fuel properties on entry to the combustor.

Description of the Related Art

There is an expectation in the aviation industry of a trend towards the use of fuels different from the traditional kerosene-based jet fuels generally used at present. The fuels may have differing fuel characteristics relative to petroleum-based hydrocarbon fuels.

Thus, there is a need to take account of fuel properties for these new fuels and to adjust the methods of operating gas turbine engines.

SUMMARY

According to a first aspect, there is provided a method of operating a gas turbine engine, the gas turbine engine comprising:
  an engine core comprising a turbine, a compressor, a combustor arranged to combust a fuel, and a core shaft connecting the turbine to the compressor;
  a fan located upstream of the engine core;
  a fan shaft;
  a gearbox that receives an input from the core shaft and outputs drive to the fan via the fan shaft;
  a primary oil loop system arranged to supply oil to the gearbox; and
  a heat exchange system comprising:
    an air-oil heat exchanger through which oil in the primary oil loop system flows; and
    a fuel-oil heat exchanger through which the oil in the primary oil loop system and the fuel flow such that heat is transferred between the oil and the fuel, and wherein the primary oil loop system branches such that a proportion of the oil can flow along each branch and the air-oil and fuel-oil heat exchangers are arranged in a parallel configuration on different branches of the primary oil loop system; and
    a modulation valve arranged to allow the proportion of oil sent via each branch, and therefore via each heat exchanger, to be varied;
  wherein the method comprises controlling the heat exchange system so as to raise the fuel temperature to at least 135° C. on entry to the combustor at cruise conditions The inventors have appreciated that the use of fuels different from the traditional kerosene-based jet fuels, such as sustainable aviation fuels, may result in different fuel properties, and that parameters at cruise conditions may be adjusted to make use of the different fuel properties. In particular, some fuels may be heated to higher temperatures in one or more fuel-oil heat exchangers than traditional fuels, without significantly increasing coking. This may improve combustion efficiency of the fuel. Higher fuel temperatures on entry to the combustor may allow for a method providing improved oil cooling (as the fuel is able to take more heat) and/or improved fuel burn efficiency. For example, fuel viscosity affects how fuel is delivered into and ignited by the combustor. Viscosity may affect droplet size from fuel spray nozzles, which may in turn impact burn efficiency. Taking the fuel viscosity into account when delivering fuel to the combustor, and controlling it as appropriate by varying heat input, may therefore provide more efficient fuel-burn, improving aircraft performance Using the fuel to take more heat from the oil, rather than relying on heat transfer from the oil to the environment/air (e.g., in the air-oil heat exchanger) may also provide a more thermally efficient engine. This may improve the cooling of the oil before it is returned to the rest of the turbine engine. Additionally, the improved cooling of the oil may in turn improve the cooling effect of the oil on the components of the engine through which it flows, for example allowing a lower flow rate of oil to provide the same cooling effect.

The air-oil heat exchanger may assist in removing excess heat from the oil of the primary oil loop system that is not transferred to the fuel. This may allow further cooling of the oil beyond the transfer of heat from the oil to the fuel in the fuel-oil heat exchanger.

The fuel flow through the fuel-oil heat exchanger, and/or one or more other properties of the heat exchange system, such as oil flow rate and/or proportion of oil or fuel recirculated through a heat exchanger or bypassing a heat exchanger, may be controlled so as to raise the fuel temperature to between 135° C. and 170° C. on entry to the combustor at cruise conditions.

The fuel temperature may be raised to at least 140° C. on entry to the combustor at cruise conditions. The fuel temperature may be raised to at least 150° C., 170° C., or 190° C. on entry to the combustor at cruise conditions.

The fuel temperature may be raised to between 135-150° C., 135-160° C., 135-170° C., 135-180° C., 135-190° C., or 135-200° C. on entry to the combustor at cruise conditions. The heat exchange system may be controlled (e.g. by controlling fuel flow) so as to raise the fuel temperature to an average of at least 140° C., 150° C., 160° C., 170° C., 180° C., 190° C., or 200° C. on entry to the combustor at cruise conditions.

The fuel temperatures on entry to the combustor at cruise conditions may be defined as an average over at least 5 minutes, and optionally over ten minutes, under steady state cruise conditions. These average temperatures do not include transient spikes in temperature, which may be defined as fluctuations in temperature of the fuel during operation, often elevation of the temperature. Each fluctuation may not last more than 5 minutes. A fuel temperature of at least 135° C. on entry to the combustor at cruise conditions therefore requires the fuel temperature to remain at or above 135° C. over a period of time, and a transient spike to a temperature above 135° C. is not sufficient.

The two or more branches of the primary oil loop system may re-join after the heat exchanger system, such that the oil recombines after heat is transferred from the oil.

The modulation valve allows variation of the amount of heat transferred from the oil by the air-oil and fuel-oil heat exchangers. The level of oil flow (and so heat transfer from the oil to the air or fuel) may be modified based on the temperature of the fuel leaving the primary fuel-oil heat exchanger, or entering the combustor, and so allow for the control of the fuel temperature within a defined upper and lower bound. This may assist in ensuring improved efficiency of the turbine engine (e.g. by raising the fuel temperature) without risking unnecessary damage to a fuel pump or other components downstream of the fuel-oil heat exchanger by using a temperature that is too high for the durability of said component. The reduced maximum temperature to which the component is exposed may reduce creep, thermal damage to features of the component such as seals, and/or reduce damage over cycling resulting from different thermal expansions of different features of the component, so extending life and/or improving performance for a given age of the component.

The modulation valve may be arranged to divert a fixed portion of the flow of oil to each of the fuel-oil heat exchanger and the air-oil heat exchanger during operation of the engine. Alternatively, the modulation valve may be arranged to divert a variable portion of the flow of oil to each of the fuel-oil heat exchanger and the air-oil heat exchanger during operation of the engine. The modulation valve may be actively controlled to vary the proportion of oil sent via each heat exchanger. This active control may be based on one or more operating parameters, such as fuel and/or oil temperature or fuel calorific value. The active control may be automated and implemented by a controller of the heat exchange system.

The gas turbine engine may further comprise an integrated drive generator and a secondary oil loop system arranged to provide oil to the integrated drive generator. The heat exchange system may further comprise a secondary fuel-oil heat exchanger arranged to receive the fuel and oil from the secondary oil loop system. The method may comprise transferring heat between the oil from the secondary oil loop system and the fuel using the secondary fuel-oil heat exchanger. The secondary fuel-oil heat exchanger may be referred to as a secondary heat exchanger for brevity.

The fuel-oil heat exchanger through which oil of the primary oil loop system flows may be referred to as a primary fuel-oil heat exchanger. The primary fuel-oil heat exchanger may be referred to as a primary heat exchanger for brevity. The fuel may flow through the secondary fuel-oil heat exchanger prior to flowing through the primary fuel-oil heat exchanger, such that heat is transferred from the oil in the secondary oil loop system to the fuel before heat is transferred from the oil in the primary oil loop system to the fuel.

The step of controlling the heat exchange system so as to raise the fuel temperature may comprise adjusting an amount of fuel sent through at least one of the primary fuel-oil heat exchanger and the secondary fuel-oil heat exchanger (as opposed to bypassing the respective heat exchanger).

The heat exchange system may comprise at least one bypass pipe arranged to allow fuel (or oil) to bypass a heat exchanger, or multiple heat exchangers, of the heat exchange system. The method may comprise adjusting the amount of fuel (or oil) sent through the bypass pipe based on fuel temperature.

The controlling the heat exchange system so as to raise the fuel temperature may therefore comprise controlling oil flow through the one or more heat exchangers and/or controlling fuel flow through the one or more heat exchangers.

According to a second aspect, there is provided a gas turbine engine for an aircraft comprising:

an engine core comprising a turbine, a compressor, a combustor arranged to combust a fuel, and a core shaft connecting the turbine to the compressor;
a fan located upstream of the engine core, the fan comprising a plurality of fan blades;
a gearbox that is arranged to receive an input from the core shaft and output drive to the fan so as to drive the fan at a lower rotational speed than the core shaft; and
a primary oil loop system arranged to supply oil to the gearbox; and
a heat exchange system comprising:
an air-oil heat exchanger through which oil in the primary oil loop system flows; and
a fuel-oil heat exchanger through which the oil in the primary oil loop system and the fuel flow such that heat is transferred between the oil and the fuel, and wherein the primary oil loop system branches such that a proportion of the oil can flow along each branch and the air-oil and fuel-oil heat exchangers are arranged in a parallel configuration on different branches of the primary oil loop system; and
a modulation valve arranged to allow the proportion of oil sent via each branch to be varied, wherein:
the heat exchange system is arranged to raise the fuel temperature to an average of at least 135° C. on entry to the combustor at cruise conditions The gas turbine engine may further comprise an accessory gearbox and a pump shaft, wherein the accessory gearbox receives an input from the core shaft and outputs drive to the fuel pump via the pump shaft. The pump speed may therefore be linked to core shaft rotation speed, and may have, by means of the gearbox, a fixed speed relationship between the core shaft (or in some engine architectures, another intermediate shaft) and the fuel pump. In some implementations, the accessory gearbox may instead be arranged to provide a fixed number of different speeds for a given core shaft speed. The recirculation of fuel may allow a wider variety of fuel flow rates into the combustor for the given number of pump speeds available at a certain shaft speed. The recirculation of fuel may allow multiple different fuel flow rates into the combustor at a given core shaft speed in implementations in which there is a single fixed speed relationship between the core shaft and the fuel pump.

It is envisaged that all features described for the first aspect can equally apply to the second aspect.

According to a third aspect, there is provided a method of operating a gas turbine engine, the gas turbine engine comprising:

an engine core comprising a turbine, a compressor, a combustor arranged to combust a fuel, and a core shaft connecting the turbine to the compressor;
a fan located upstream of the engine core;
a fan shaft;
a gearbox that receives an input from the core shaft and outputs drive to the fan via the fan shaft;
a primary oil loop system arranged to supply oil to the gearbox; and
a heat exchange system comprising:
an air-oil heat exchanger through which oil in the primary oil loop system flows; and
a fuel-oil heat exchanger through which the oil in the primary oil loop system and the fuel flow such that heat is transferred between the oil and the fuel, and wherein the primary oil loop system branches such that a proportion of the oil can flow along each branch and the air-oil and fuel-oil heat exchangers are arranged in a parallel configuration on different branches of the primary oil loop system; and a modulation valve arranged to allow the proportion of oil sent via each branch to be varied;

wherein the method comprises transferring between 200 and 600 kJ/m$^3$ of heat from the oil to the fuel in the heat exchange system at cruise conditions.

As heat transfer is measured per unit volume of fuel, this may be thought of as a heat transfer rate normalised for fuel flow rate variations at cruise.

It will be appreciated that the heat transfer using the heat exchanger must be completed before/as the fuel reaches the combustor, so the method may be described as comprising using the heat exchange system to transfer between 200 and 600 kJ/m$^3$ of heat from the oil to the fuel at cruise conditions, before the fuel reaches the combustor. Any additional temperature rise in the combustor itself is due to the combustion, not to the heat exchange system. The amount of heat transferred to the fuel may therefore be calculated based on a temperature of fuel on approach or entry to the combustor as compared to a temperature of fuel in a fuel tank of the aircraft. It will be appreciated that the heat transfer is noted per unit volume (m$^3$) of fuel reaching the combustor so as to adjust for fuel flow rate and any recirculation through one or more heat exchangers or bypass of one or more heat exchangers as described below. The amount of heat transferred to the fuel may therefore be calculated based on a temperature of fuel on approach or entry to the combustor as compared to a temperature of fuel in a fuel tank of the aircraft. In most implementations, it may be assumed that any temperature rise of the fuel due to other engine components (as opposed to due to heat transfer from the oil) is minimal.

The inventors have appreciated that the use of fuels different from the traditional kerosene-based jet fuels, such as sustainable aviation fuels, may result in different fuel properties, and that parameters at cruise conditions may be adjusted to make use of the different fuel properties. For example, some fuels may have a higher thermal stability and/or a higher heat capacity, so allowing increased heat transfer to the fuel and/or a higher running temperature. In particular, a greater amount of heat can be transferred from the oil to the fuel in the fuel-oil heat exchanger in some implementations. This may improve the cooling of the oil before it is returned to the rest of the turbine engine, provide a more thermally efficient engine with reduced heat energy loss to the environment. This in turn improves the cooling effect of the oil on the components of the engine through which it flows.

The heat exchange system may be controlled so as to transfer between 300 and 500 kJ/m$^3$ of heat to the fuel from the oil at cruise conditions.

The heat exchange system may be controlled so as to transfer between 350 and 450 kJ/m$^3$ of heat to the fuel from the oil at cruise conditions.

The heat exchange system may be controlled so as to transfer between 250-550 kJ/m$^3$, 250-450 kJ/m$^3$, 300-450 kJ/m$^3$, 300-400 kJ/m$^3$, 350-400 kJ/m$^3$, 400-450 kJ/m$^3$, 400-500 kJ/m$^3$ of heat to the fuel from the oil at cruise conditions.

At least 50% of the heat transferred away from the oil of the primary loop system may transferred to the fuel by the fuel-oil heat exchanger. Approximately 60% of the heat transferred from the oil of the primary loop system may be transferred to the fuel by the fuel-oil heat exchanger. The remainder of the heat transferred from the oil may be transferred in the air-oil heat exchanger or lost to the environment, or in a further heat exchanger, such as an oil-oil heat exchanger.

As described with respect to earlier aspects, one or more parameters of the heat exchange system may be adjusted to obtain the desired heat transfer—e.g. oil flow, and/or fuel flow through each heat exchanger, and/or the amount of recirculation.

According to a fourth aspect, there is provided a gas turbine engine for an aircraft comprising:

an engine core comprising a turbine, a compressor, a combustor arranged to combust a fuel, and a core shaft connecting turbine to the compressor;

a fan located upstream of the engine core, the fan comprising a plurality of fan blades;

a gearbox that is arranged to receive an input from the core shaft and output drive to the fan so as to drive the fan at a lower rotational speed than the core shaft; and a primary oil loop system arranged to supply oil to the gearbox; and a heat exchange system comprising:

an air-oil heat exchanger through which oil in the primary oil loop system flows; and a fuel-oil heat exchanger through which the oil in the primary oil loop system and the fuel flow such that heat is transferred between the oil and the fuel, and wherein the primary oil loop system branches such that a proportion of the oil can flow along each branch and the air-oil and fuel-oil heat exchangers are arranged in a parallel configuration on different branches of the primary oil loop system; and a modulation valve arranged to allow the proportion of oil sent via each branch to be varied, wherein:

the heat exchange system is arranged to transfer between 200 and 600 kJ/m$^3$ of heat from the oil to the fuel (before the fuel reaches the combustor) at cruise conditions.

It is envisaged that all features described for the third aspect can equally apply to the fourth aspect.

Further, any or all features of the first and second aspects may be used in conjunction with those of the third and fourth aspects.

According to a fifth aspect, there is provided a method of operating a gas turbine engine, the gas turbine engine comprising:

an engine core comprising a turbine, a compressor, a combustor arranged to combust a fuel, and a core shaft connecting the turbine to the compressor;

a fan located upstream of the engine core;

a fan shaft;

a gearbox that receives an input from the core shaft and outputs drive to the fan via the fan shaft;

a primary oil loop system arranged to supply oil to the gearbox; and a heat exchange system comprising:

an air-oil heat exchanger through which oil in the primary oil loop system flows; and a fuel-oil heat exchanger through which the oil in the primary oil loop system and the fuel flow such that heat is transferred between the oil and the fuel, and wherein the primary oil loop system branches such that a proportion of the oil can flow along each branch and the air-oil and fuel-oil heat exchangers are arranged in a parallel configuration on different branches of the primary oil loop system; and a modulation valve arranged to allow the proportion of oil sent via each branch to be varied;

wherein the method comprises controlling the heat exchange system so as to adjust the fuel viscosity to a maximum of 0.58 mm$^2$/s (i.e. lower than or equal to 0.58 cSt) on entry to the combustor at cruise conditions.

The adjustment of the fuel viscosity may be done by heating the fuel.

The viscosity of fuel entering the combustor at cruise conditions is therefore lowered to a value below or equal to 0.58 mm$^2$/s.

The inventors have appreciated that fuel viscosity has an effect on how the fuel is delivered into and ignited in the combustor (for example, droplet size from fuel spray nozzles, which may impact burn efficiency). Taking the fuel viscosity into account when delivering fuel to the combustor, and controlling it as appropriate by varying heat input, may therefore provide more efficient fuel-burn, improving aircraft performance.

It will be appreciated that lowering viscosity too far may worsen burn efficiency and/or deleteriously affect the lubrication of engine components (e.g. pump bearings) by the fuel. Further, a low fuel viscosity may increase laminar leakages within certain components. A minimum viscosity may therefore also be selected. For example, the method may comprise controlling the heat exchange system such that the fuel viscosity remains above 0.2 mm$^2$/s, 0.25 mm$^2$/s, 0.3 mm$^2$/s, 0.35 mm$^2$/s, or 0.4 mm$^2$/s on entry to the combustor at cruise conditions.

The inventors have appreciated that, especially with the use of fuels different from the traditional kerosene-based jet fuels, such as sustainable aviation fuels, fuel properties at cruise conditions may be controlled by careful engine management so as to improve performance. In this instance, a lower viscosity can be obtained, which can affect combustion efficiency, in particular with respect to fuel nozzle spray performance within the combustor. Fuel nozzle spray performance affects burn efficiency of the fuel. A lower viscosity of the fuel at cruise conditions may lend itself to a more efficient engine. Fuel flow can be optimised to improve the efficiency of the turbine engine, to which the lower viscosity of said fuel can contribute. For example, fuel viscosity affects how fuel is delivered into and ignited by the combustor. Viscosity may affect droplet size from fuel spray nozzles, which may in turn impact burn efficiency. Taking the fuel viscosity into account when delivering fuel to the combustor, and controlling it as appropriate by varying heat input, may therefore provide more efficient fuel-burn, improving aircraft performance.

The heat exchange system may be controlled so as to adjust the fuel viscosity to between 0.35 mm$^2$/s and 0.53 mm$^2$/s on entry to the combustor at cruise conditions.

The heat exchange system may be controlled so as to adjust the fuel viscosity to between 0.40 mm$^2$/s and 0.48 mm$^2$/s on entry to the combustor at cruise conditions.

The heat exchange system may be controlled so as to adjust the fuel viscosity to lower than 0.50 mm$^2$/s on entry to the combustor at cruise conditions. The heat exchange system may be controlled so as to adjust the fuel viscosity to lower than 0.48 mm$^2$/s on entry to the combustor at cruise conditions. The heat exchange system may be controlled so as to adjust the fuel viscosity to lower than 0.46 mm$^2$/s, lower than 0.44 mm$^2$/s, or lower than 0.42 mm$^2$/s on entry to the combustor at cruise conditions.

The method may comprise transferring heat to the fuel from the oil before the fuel enters the combustor so as to lower the fuel viscosity to between 0.58 mm$^2$/s and 0.30 mm$^2$/s on entry to the combustor at cruise conditions.

The method may comprise transferring heat to the fuel from the oil before the fuel enters the combustor so to lower the fuel viscosity to between 0.50 mm$^2$/s and 0.35 mm$^2$/s, or between 0.48 mm$^2$/s and 0.40 mm$^2$/s, or between 0.44 mm$^2$/s and 0.42 mm$^2$/s on entry to the combustor at cruise conditions.

The method may comprise transferring heat to the fuel from the oil before the fuel enters to the combustor so as to lower the fuel viscosity to a maximum of 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31 or 0.30 mm$^2$/s or lower on entry to the combustor at cruise conditions.

The fuel-oil heat exchanger on the primary oil loop system may be referred to as a primary fuel-oil heat exchanger.

As described with respect to earlier aspects, one or more parameters of the heat exchange system may be adjusted to obtain the desired viscosity—e.g. oil flow, and/or fuel flow through each heat exchanger and/or the amount of recirculation.

For example, the controlling the heat exchange system so as to adjust the fuel viscosity may comprise adjusting an amount of fuel sent through at least one of the primary fuel-oil heat exchanger and a secondary fuel-oil heat exchanger as described below, where present (as opposed to bypassing that heat exchanger).

The heat exchange system may comprise at least one bypass pipe arranged to allow fuel (or oil) to bypass at least one heat exchanger of the heat exchange system. The controlling the heat exchange system so as to adjust the fuel viscosity may comprise adjusting the amount of fuel (or oil) sent through the bypass pipe instead of through the heat exchanger.

The heat exchange system may comprise at least one recirculation pipe arranged to take fuel which has already passed through a given heat exchanger of the heat exchange system back to an inlet of that heat exchanger. The controlling the heat exchange system so as to adjust the fuel viscosity may comprise adjusting the amount of fuel sent through the recirculation pipe.

The heat exchange system may comprise one or more pumps, valves, recirculation pipes, and/or bypass pipes to allow flows of oil and/or fuel through and around heat exchangers to be controlled so as to tailor heat transfer, and thereby adjust viscosity.

According to a sixth aspect, there is provided a gas turbine engine for an aircraft comprising:
  an engine core comprising a turbine, a compressor, a combustor arranged to combust a fuel, and a core shaft connecting the turbine to the compressor;
  a fan located upstream of the engine core, the fan comprising a plurality of fan blades;
  a gearbox that is arranged to receive an input from the core shaft and output drive to the fan so as to drive the fan at a lower rotational speed than the core shaft; and
  a primary oil loop system arranged to supply oil to the gearbox; and
  a heat exchange system comprising:
    an air-oil heat exchanger through which oil in the primary oil loop system flows; and
    a fuel-oil heat exchanger through which the oil in the primary oil loop system and the fuel flow such that heat is transferred between the oil and the fuel, and wherein the primary oil loop system branches such that a proportion of the oil can flow along each branch and the air-oil and fuel-oil heat exchangers are arranged in a parallel configuration on different branches of the primary oil loop system; and a modulation valve arranged to allow the proportion of oil sent via each heat exchanger to be varied, wherein:

the heat exchange system is arranged to adjust the fuel viscosity to a maximum of 0.58 mm$^2$/s on entry to the combustor at cruise conditions.

It is envisaged that all features described for the fifth aspect can equally apply to the sixth aspect.

Further, any or all features of the first to fourth aspects may be used in conjunction with those of the fifth and sixth aspects.

In any or all of the above aspects, the gas turbine engine may further comprise:

an integrated drive generator; and a secondary oil loop system arranged to provide oil to the integrated drive generator.

The heat exchange system may comprise an oil-oil heat exchanger arranged to transfer heat between the oil of the primary loop system and the oil of the secondary loop system.

The oil of the primary oil loop system may be physically separate from the oil of the secondary oil loop system; as such the primary and secondary oil loop systems may be distinct, separate closed loops. As such, the primary oil loop system may be referred to as a primary closed loop oil system and the secondary oil loop system may be referred to as a secondary closed loop oil system. The oil of the primary oil loop system may or may not by chemically similar to, or the same as, the oil of the secondary oil loop system. That is to say that the primary and secondary oil loop systems may be fluidly isolated such that oil never mixes between the two, and the oil in each may be chemically distinct and/or may be pumped at a different rate.

The oil-oil heat exchanger may be positioned downstream of one or both of the air-oil and fuel-oil heat exchangers of the primary oil loop system. The primary oil loop system may comprise two branches through which oil flows, to provide the parallel heat exchanger configuration described above, and the oil-oil heat exchanger may be on the same branch as the air-oil heat exchanger (i.e. in parallel with the fuel-oil heat exchanger).

In implementations with a secondary oil loop system, the one or more heat exchangers of the heat exchange system may further comprise a secondary fuel-oil heat exchanger arranged to receive the fuel and the oil from the secondary oil system. Heat may be transferred between the oil from the secondary oil system and the fuel using the secondary fuel-oil heat exchanger. The secondary fuel-oil heat exchanger may be referred to as an integrated drive generator (IDG) heat exchanger.

The fuel-oil heat exchanger through which oil of the primary oil loop system flows may be referred to as a primary fuel-oil heat exchanger. The fuel may flow through the secondary fuel-oil heat exchanger prior to flowing through the primary fuel-oil heat exchanger, such that heat is transferred from the oil in the secondary oil system to the fuel before heat is transferred from the oil in the primary oil system to the fuel.

The controlling the heat exchange system so as to raise the fuel temperature or affect other parameters may additionally or alternatively comprise adjusting an amount of fuel sent through the primary fuel-oil heat exchanger and the secondary fuel-oil heat exchanger. This adjustment may comprise adjusting what proportion of fuel is sent down a bypass pipe passing the respective heat exchanger, rather than being sent through the heat exchanger. Alternatively or additionally, this adjustment may comprise adjusting what proportion of fuel is recirculated from an outlet of a heat exchanger back to an inlet of that heat exchanger, for example using a recirculation pipe. It will be appreciated that a recirculation pipe could be used interchangeably as a bypass pipe in implementations in which the flow direction through that pipe can be reversed, but that otherwise separate pipes may be used.

The primary oil loop system may comprise a modulation valve arranged to adjust the oil flow between the branches of the primary oil loop system. This modulation valve may be controlled as part of a feedback system to adjust a desired fuel property to lie within a desired range, as described above.

The primary fuel-oil heat exchanger may be referred to as a main fuel-oil heat exchanger. The majority of the heat transfer between the oil and the fuel may occur in the primary fuel-oil heat exchanger. The primary function of the primary fuel-oil heat exchanger may be to heat the fuel before it is provided to the combustor. At least substantially all of the fuel may pass through the main fuel-oil heat exchanger.

A ratio of the heat transfer from the oil to the fuel for the primary and secondary fuel-oil heat exchangers may be approximately between 70:30 and 90:10. The primary fuel-oil heat exchanger may therefore be responsible for 70-90% of the heat transfer—it may be referred to as "primary" due to being responsible for most of the heat transfer—i.e. being the primary source of heat for heating the fuel before entry to the combustor.

A ratio of the heat transfer from the oil to the fuel for the primary and secondary fuel-oil heat exchangers may be approximately 80:20.

In other examples, the ratio of the heat transfer from the oil to fuel for the secondary fuel-oil heat exchanger may be higher.

The combination of the heat exchange system and the fuel pump may herein be referred to as a fuel management system.

The gas turbine engine may form part of an aircraft. The aircraft may comprise a fuel tank, and a fuel supply pump configured to supply a flow of fuel to the fuel management system of the engine itself. The fuel supply pump may be described as a fuel tank pump or a low pressure pump, and is located upstream of the engine, and therefore upstream of the primary fuel-oil heat exchanger.

The fuel pump of the fuel management system may be described herein as a main fuel pump or engine fuel pump, as, unlike the fuel supply pump, it is a part of the engine itself. The main fuel pump is located downstream of the primary fuel-oil heat exchanger. One or more auxiliary fuel pumps may be located at any suitable position along the fuel flow path.

In some example implementations, a third, fourth or any suitable number of further fuel-oil heat exchangers may be present, optionally with a fuel valve operable to control a flow rate of fuel therethrough.

Oil flow within the gas turbine engine may follow one or more closed loops. The primary oil loop system may be considered a closed loop oil system and may be configured to supply a recirculating flow of oil within the engine and be described as a recirculating lubrication and/or cooling system, or as a recirculating oil system. The primary fuel-oil heat exchanger may be described as forming part of the primary closed loop system. The recirculating lubrication and/or cooling system may be described as an oil heat management system, as heat is removed from the oil after it has been warmed in the process of lubricating and/or cooling the gearbox.

The primary oil loop system may comprise at least a first oil pump configured to pump a flow of oil around at least a portion of the recirculating oil system. The first oil pump may be located at any suitable position around the recirculating oil system. The recirculating oil system may be configured such that the flow of oil flows through engine components (e.g. the engine bearing chamber and gearbox) and may then be collected in a sump. The first oil pump may be configured to pump oil from the sump to a first oil tank. As such, the first oil pump may be described as a scavenge pump.

The first oil tank may be suitable for containing a volume of oil. The first oil tank may be configured to contain any suitable volume of oil. The first oil tank may be arranged to remove gasses from the oil in the first oil tank, for example comprising a de-aerator. Oil leaving the oil tank may pass through a filter, strainer, or the like.

A second oil pump may be located between the first oil tank and the primary fuel-oil heat exchanger. The second oil pump may be described as a feed pump. The second oil pump may be configured to pump oil from the first oil tank to the primary fuel-oil heat exchanger and the air-oil heat exchanger.

At cruise conditions, and for all aspects described herein, the flow of oil entering any of the fuel-oil heat exchangers may have a higher average temperature than the flow of fuel entering the same fuel-oil heat exchanger at cruise conditions. In this way, thermal energy may be transferred from the flow of oil to the flow of fuel flowing through the one or more fuel-oil heat exchangers at cruise conditions. As such, oil leaving each heat exchanger may have a lower temperature than the oil entering that heat exchanger at cruise conditions.

In implementations with a secondary oil loop system, the secondary oil loop system may have a similar architecture to the primary oil loop system (e.g. comprising an oil tank and one or more pumps), but may supply oil to the integrated drive generator (instead of a main gearbox), and the oil may flow through the secondary fuel-oil heat exchanger (instead of the primary fuel-oil heat exchanger).

Where the primary and/or secondary closed loop systems comprise at least one fuel-oil heat exchanger and at least one air-oil heat exchanger, at least a portion of the flow of oil may not flow through the fuel-oil heat exchanger and/or the air-oil heat exchanger.

For example, when at least one fuel-oil heat exchanger and at least one air-oil heat exchanger are provided in flow series, at least one flow bypass may be configured to allow at least a portion of the flow of oil to bypass, and therefore not flow through, the fuel-oil heat exchanger and/or the air-oil heat exchanger.

When at least one fuel-oil heat exchanger and at least one air-oil heat exchanger are provided in parallel, the recirculating lubrication system may be configured such that any suitable percentage of oil flows through each of the fuel-oil and air-oil heat exchangers. A flow bypass may again be provided by one or each heat exchanger, to allow fuel in that branch of the parallel arrangement to bypass the or each heat exchanger on that branch.

It will be appreciated that, in any of the examples described herein, an intermediate heat transfer fluid could be used rather than a direct oil to fuel heat transfer, and that the term "fuel-oil heat exchanger" can include heat exchangers using such an intermediate fluid. Similarly, an oil-oil or oil-air heat exchanger may use an intermediate heat transfer fluid in some implementations.

As noted elsewhere herein, the present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner. Such a gas turbine engine may be, for example, configured for land or marine-based power generation applications.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades). Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propeller stages may be driven by a gearbox. The gearbox may be of the type described herein.

An engine according to the present disclosure may be a turbofan engine. Such an engine may be a direct-drive turbofan engine in which the fan is directly connected to the fan-drive turbine, for example without a gearbox, via a core shaft. In such a direct-drive turbofan engine, the fan may be said to rotate at the same rotational speed as the fan-drive turbine. Purely by way of example, the fan-drive turbine may be a first turbine, the core shaft may be a first core shaft, and the gas turbine engine may further comprise a second turbine and a second core shaft connecting the second turbine to the compressor. The second turbine, the compressor, and second core shaft may be arranged to rotate at a higher rotational speed than the first core shaft. In such an arrangement, the second turbine may be positioned axially upstream of the first turbine.

An engine according to the present disclosure may be a geared turbofan engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound planetary gearbox (which may have the input on the sun gear and the output on the ring gear, and thus be referred to as a "compound star" gearbox), for example having two stages of reduction.

The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a reduction ratio in the range of from 3.1 or 3.2 to 3.8. Purely by way of further example, the gearbox may be a "star" gearbox having a reduction ratio in the range 3.0 to 3.1. Purely by way of further example, the gearbox may be a "planetary" gearbox having a reduction ratio in the range 3.6 to 4.2. In some arrangements, the gear ratio may be outside these ranges.

In any gas turbine engine as described and/or claimed herein, fuel of a given composition or blend is provided to a combustor, which may be provided downstream of the fan and compressor(s) with respect to the flowpath (for example axially downstream). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. For example, the gas turbine engine may be a direct-drive turbofan gas turbine engine comprising 13 or 14 compressor stages (in addition to the fan). Such an engine may, for example, comprise 3 stages in the first (or "low pressure") compressor and either 10 or 11 stages in the second (or "high pressure") compressor. By way of further example, the gas turbine engine may be a "geared" gas turbine engine (in which the fan is driven by a first core shaft via a reduction gearbox) comprising 11, 12 or 13 compressor stages (in addition to the fan). Such an engine may comprise 3 or 4 stages in the first (or "low pressure") compressor and 8 or 9 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes, or vice versa, as required. The respective rows of rotor blades and stator vanes may be axially offset from each other. The second (or "high pressure") turbine may comprise 2 stages in any arrangement (for example regardless of whether it is a geared or direct-drive engine). The gas turbine engine may be a direct-drive gas turbine engine comprising a first (or "low pressure") turbine having 5, 6 or 7 stages. Alternatively, the gas turbine engine may be a "geared" gas turbine engine comprising a first (or "low pressure") turbine having 3 or 4 stages.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32 or 0.29 to 0.30. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 140 cm, 170 cm, 180 cm, 190 cm, 200 cm, 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 240 cm, or 250 cm to 280 cm, or 320-cm to 380 cm. Purely by way of non-limitative example, the fan diameter may be in the range of from 170 cm to 180 cm, 190 cm to 200 cm, 200 cm to 210 cm, 210 cm to 230 cm, 290 cm to 300 cm or 340 cm to 360 cm.

The rotational speed of the fan may vary in use. Generally, the rotational speed is lower for fans with a higher diameter. Purely by way of non-limitative example, the rotational speed of the fan at cruise conditions may be less than 3500 rpm, for example less than 2600 rpm, or less than 2500 rpm, or less than 2300 rpm. Purely by way of further non-limitative example, the rotational speed of the fan at cruise conditions for a "geared" gas turbine engine having a fan diameter in the range of from 200 cm to 210 cm may be in the range of from 2750 to 2900 rpm. Purely by way of further non-limitative example, the rotational speed of the fan at cruise conditions for a "geared" gas turbine engine having a fan diameter in the range of from 210 cm to 230 cm may be in the range of from 2500 to 2800 rpm. Purely by way of further non-limitative example, the rotational speed of the fan at cruise conditions for a "geared" gas turbine engine having a fan diameter in the range of from 340 cm to 360 cm may be in the range of from 1500 to 1800 rpm. Purely by way of further non-limitative example, the rotational speed of the fan at cruise conditions for a direct drive engine having a fan diameter in the range of from 190 cm to 200 cm may be in the range of from 3600 to 3900 rpm. Purely by way of further non-limitative example, the rotational speed of the fan at cruise conditions for a direct drive engine having a fan diameter in the range of from 300 cm to 340 cm may be in the range of from 2000 to 2800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3 (for example for a geared gas turbine engine).

Gas turbine engines in accordance with the present disclosure may have any desired bypass ratio (BPR), where the bypass ratio is defined as the ratio of the mass flow rate of the flow through the bypass duct to the mass flow rate of the flow through the core. In some arrangements the bypass ratio at cruise conditions may be greater than (or on the order of) any of the following: 9. 9.5, 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio at cruise conditions may be in an inclusive range bounded by any two of the values in the previous sentence (i.e. the values may form upper or lower bounds), for example in the range of from 12 to 16, 13 to 15, or 13 to 14. Purely by way of non-limitative example, the bypass ratio at cruise conditions of a direct-drive gas turbine engine according to the present disclosure may be in the range of from 9:1 to 11:1. Purely by way of further non-limitative example, the bypass ratio at cruise conditions of a geared gas turbine engine according to the present disclosure may be in the range of from 12:1 to 15:1 The bypass duct may be substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise conditions may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from 40 to 45. Purely by way of non-limitative example, the overall pressure ratio at cruise conditions of a geared gas turbine engine having a fan diameter in the range of from 210 cm to 230 cm may be in the range of from 45 to 55. Purely by way of non-limitative example, the overall pressure ratio at cruise conditions of a geared gas turbine engine having a fan diameter in the range of from 340 cm to 360 cm may be in the range of from 50 to 60. Purely by way of non-limitative example, the overall pressure ratio at cruise conditions of a direct-drive gas turbine engine having a fan diameter in the range of from 300 cm to 340 cm may be in the range of from 50 to 60.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}$ s. Such engines may be particularly efficient in comparison with conventional gas turbine engines. Purely by way of non-limitative example, the specific thrust of a geared gas turbine engine having a fan diameter in the range of from 200 cm to 210 cm may be in the range of from 90 $Nkg^{-1}s$ to 95 $Nkg^{-1}$ s. Purely by way of non-limitative example, the specific thrust of a geared gas turbine engine having a fan diameter in the range of from 210 cm to 230 cm may be in the range of from 80 $Nkg^{-1}s$ to 90 $Nkg^{-1}s$. Purely by way of non-limitative example, the specific thrust of a geared gas turbine engine having a fan diameter in the range of from 340 cm to 360 cm may be in the range of from 70 $Nkg^{-1}s$ to 90 $Nkg^{-1}s$. Purely by way of non-limitative example, the specific thrust of a direct drive gas turbine engine having a fan diameter in the range of from 300 cm to 340 cm may be in the range of from 90 $Nkg^{-1}s$ to 120 $Nkg^{-1}$ s.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 100 kN, 110 kN, 120 kN, 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 155 kN to 170 kN, 330 kN to 420 kN, or 350 kN to 400 kN. Purely by way of non-limitative example, the maximum thrust of a geared gas turbine engine having a fan diameter in the range of from 200 cm to 210 cm may be in the range of from 140 kN to 160 kN. Purely by way of non-limitative example, the maximum thrust of a geared gas turbine engine having a fan diameter in the range of from 210 cm to 230 cm may be in the range of from 150 kN to 200 kN. Purely by way of non-limitative example, the maximum thrust of a geared gas turbine engine having a fan diameter in the range of from 340 cm to 360 cm may be in the range of from 370 kN to 500 kN. Purely by way of non-limitative example, the maximum thrust of a direct drive gas turbine engine having a fan diameter in the range of from 300 cm to 340 cm may be in the range of from 370 kN to 500 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor. At cruise conditions, the TET may be at least (or on the order of) any of the following: 1400K, 1450K, 1500K, 1520K, 1530K, 1540K, 1550K, 1600K or 1650K. Thus, purely by way of non-limitative example, the TET at cruise conditions of a geared gas turbine engine having a fan diameter in the range of from 200 cm to 210 cm may be in the range of from 1540K to 1600K. Purely by way of non-limitative example, the TET at cruise conditions of a geared gas turbine engine having a fan diameter in the range of from 210 cm to 230 cm may be in the range of from 1590K to 1650K. Purely by way of non-limitative example, the TET at cruise conditions of a geared gas turbine engine having a fan diameter in the range of from 340 cm to 360 cm may be in the range of from 1600K to 1660K. Purely by way of non-limitative example, the TET at cruise conditions of a direct drive gas turbine engine having a fan diameter in the range of from 300 cm to 340 cm may be in the range of from 1590K to 1650K. Purely by way of non-limitative example, the TET at cruise conditions of a direct drive gas turbine engine having a fan diameter in the range of from 300 cm to 340 cm may be in the range of from 1570K to 1630K.

The TET at cruise conditions may be in an inclusive range bounded by any two of the values in the previous sentence (i.e. the values may form upper or lower bounds), for example 1530K to 1600K. The maximum TET in use of the engine may be, for example, at least (or on the order of) any of the following: 1700K, 1750K, 1800K, 1850K, 1900K, 1950K, 2000K, 2050K, or 2100K. Thus, purely by way of non-limitative example, the maximum TET of a geared gas turbine engine having a fan diameter in the range of from 200 cm to 210 cm may be in the range of from 1890K to 1960K. Purely by way of non-limitative example, the maximum TET of a geared gas turbine engine having a fan diameter in the range of from 210 cm to 230 cm may be in the range of from 1890K to 1960K. Purely by way of non-limitative example, the maximum TET of a geared gas turbine engine having a fan diameter in the range of from 340 cm to 360 cm may be in the range of from 1890K to 1960K. Purely by way of non-limitative example, the maximum TET of a direct drive gas turbine engine having a fan diameter in the range of from 300 cm to 340 cm may be in the range of from 1935K to 1995K. Purely by way of non-limitative example, the maximum TET of a direct drive gas turbine engine having a fan diameter in the range of from 300 cm to 340 cm may be in the range of from 1890K to 1950K. The maximum TET may be in an inclusive range bounded by any two of the values in the previous sentence (i.e. the values may form upper or lower bounds), for example in the range of from 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 16 or 18 fan blades. Where the fan blades have a metallic body (for example aluminium-lithium or titanium-alloy), there may be 18, 20 or 22 fan blades.

As used herein, the terms idle, taxi, take-off, climb, cruise, descent, approach, and landing have the conventional meaning and would be readily understood by the skilled person. Thus, for a given gas turbine engine for an aircraft, the skilled person would immediately recognise each term to refer to an operating phase of the engine within a given mission of an aircraft to which the gas turbine engine is designed to be attached.

In this regard, ground idle may refer to an operating phase of the engine where the aircraft is stationary and in contact with the ground, but where there is a requirement for the engine to be running. During idle, the engine may be producing between 3% and 9% of the available thrust of the engine. In further non-limitative examples, the engine may be producing between 5% and 8% of available thrust. In further non-limitative examples, the engine may be producing between 6% and 7% of available thrust. Taxi may refer to an operating phase of the engine where the aircraft is being propelled along the ground by the thrust produced by the engine. During taxi, the engine may be producing between 5% and 15% of available thrust. In further non-limitative examples, the engine may be producing between 6% and 12% of available thrust. In further non-limitative examples, the engine may be producing between 7% and 10% of available thrust. Take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. During take-off, the engine may be producing between 90% and 100% of available thrust. In further non-limitative examples, the engine may be producing between 95% and 100% of available thrust. In further non-limitative examples, the engine may be producing 100% of available thrust.

Climb may refer to an operating phase of the engine where the aircraft is being propelled by the thrust produced by the engine. During climb, the engine may be producing between 75% and 100% of available thrust. In further non-limitative examples, the engine may be producing between 80% and 95% of available thrust. In further non-limitative examples, the engine may be producing between 85% and 90% of available thrust. In this regard, climb may refer to an operating phase within an aircraft flight cycle between take-off and the arrival at cruise conditions. Additionally or alternatively, climb may refer to a nominal point in an aircraft flight cycle between take-off and landing, where a relative increase in altitude is required, which may require an additional thrust demand of the engine.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent). Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft-steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft. During either or both of descent and approach, the engine may be producing between 20% and 50% of available thrust. In further non-limitative examples, the engine may be producing between 25% and 40% of available thrust. In further non-limitative examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at any suitable condition, which may be as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at any suitable condition, for example the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
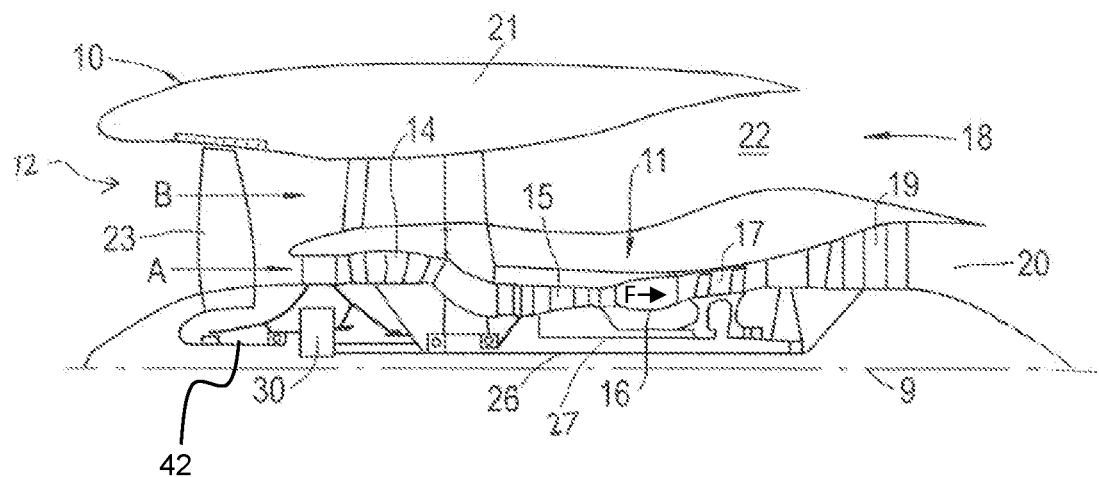
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally acts to impart increased pressure to the bypass airflow B flowing through the bypass duct 22, such that the bypass airflow B is exhausted through the bypass exhaust nozzle 18 to generally provide the majority of the propulsive thrust. The epicyclic gearbox 30 is a reduction gearbox.

Figure 2:
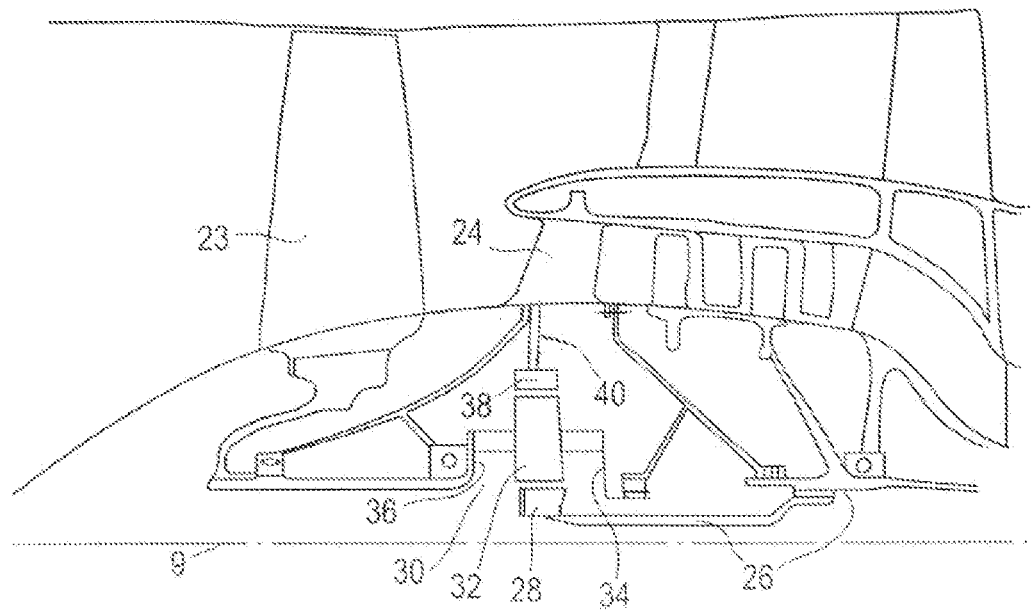
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
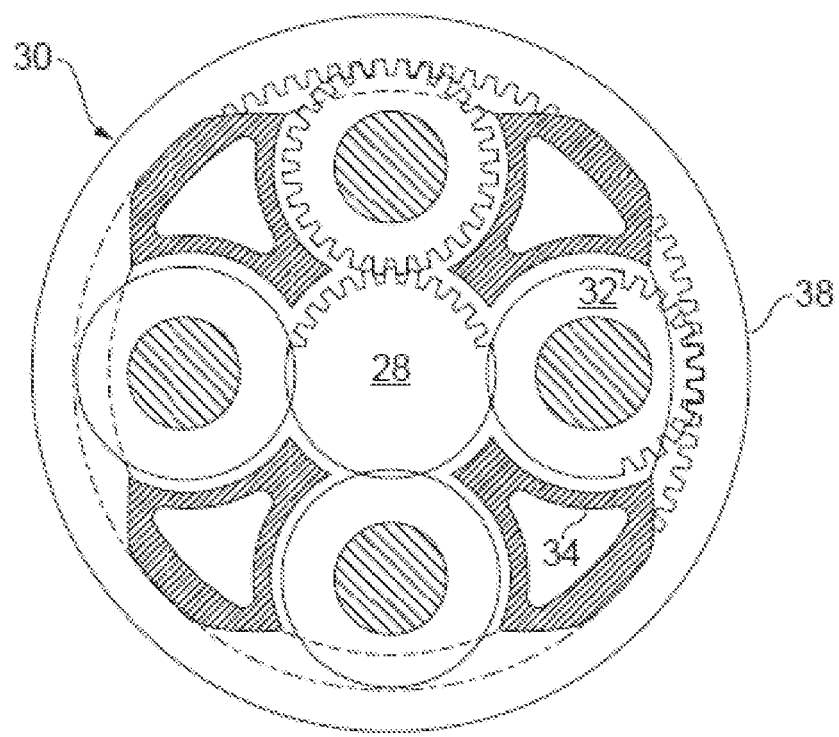
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fuel F provided to the combustion equipment 16 may comprise a fossil-based hydrocarbon fuel, such as Kerosene. Thus, the fuel F may comprise molecules from one or more of the chemical families of n-alkanes, iso-alkanes, cycloalkanes, and aromatics. Additionally or alternatively, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

Functional performance of a given composition, or blend of fuel for use in a given mission, may be defined, at least in part, by the ability of the fuel to service the Brayton cycle of the gas turbine engine 10. Parameters defining functional performance may include, for example, specific energy; energy density; thermal stability; and, emissions including particulate matter. A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refuelling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission. Other properties of the fuel may also be key to functional performance. For example, a relatively lower freeze point (° C.) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. For example, fossil-based hydrocarbon fuels may comprise molecules with approximately 7 to 18 carbons, with a significant portion of a given composition stemming from molecules with 9 to 15 carbons, with an average of 12 carbons.

A number of sustainable aviation fuel blends have been approved for use. For example, some approved blends comprise blend ratios of up to 10% sustainable aviation fuel, whilst other approved blends comprise blend ratios of between 10% and 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use.

Sustainable aviation fuels may comprise one or more of n-alkanes, iso-alkanes, cyclo-alkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. Thus, in some examples, sustainable aviation fuels may comprise either or both of a density of between 90% and 98% that of kerosene and a calorific value of between 101% and 105% that of kerosene.

Owing at least in part to the molecular structure of sustainable aviation fuels, sustainable aviation fuels may provide benefits including, for example, one or more of a higher specific energy (despite, in some examples, a lower energy density); higher specific heat capacity; higher thermal stability; higher lubricity; lower viscosity; lower surface tension; lower freeze point; lower soot emissions; and, lower CO2 emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

Figure 4:
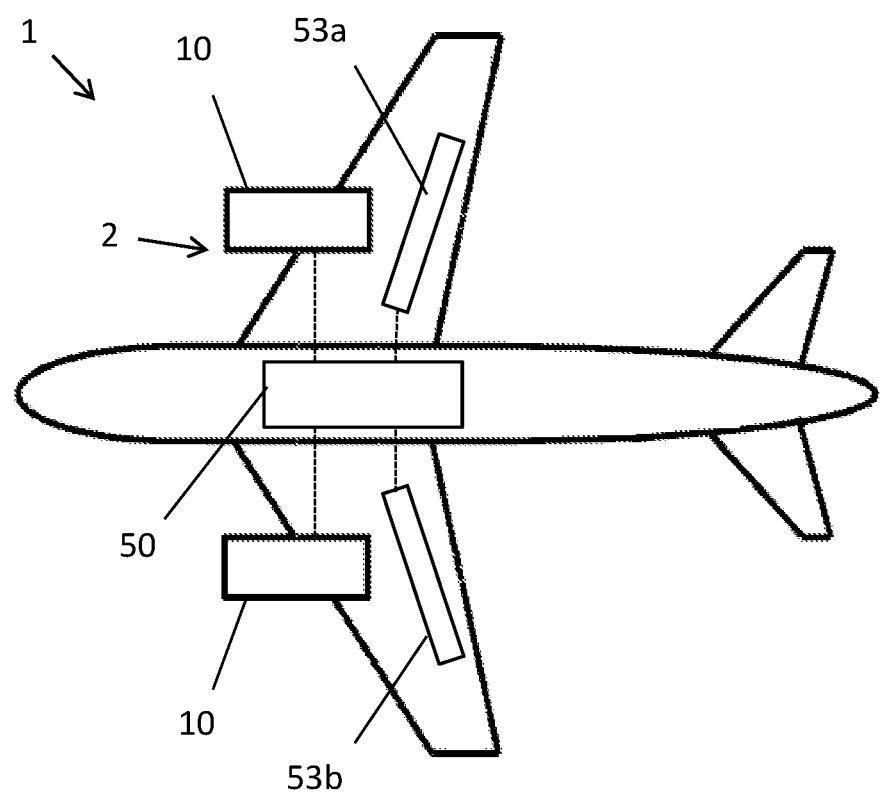
FIG. 4 shows an example aircraft comprising two gas turbine engines.

FIG. 4 shows an aircraft 1 with a propulsion system 2 comprising two gas turbine engines 10. The gas turbine engines 10 are supplied with fuel from a fuel supply system onboard the aircraft 1. The fuel supply system of the examples pictured comprises a single fuel source 50, 53.

For the purposes of the present application the term "fuel source" means either 1) a single fuel tank or 2) a plurality of fuel tanks which are fluidly interconnected.

In the present examples, the first (and, in these examples, only) fuel source comprises a centre fuel tank 50, located primarily in the fuselage of the aircraft 1 and a plurality of wing fuel tanks 53a, 53b, where at least one wing fuel tank is located in the port wing and at least one wing fuel tank is located in the starboard wing for balancing. All of the tanks 50, 53 are fluidly interconnected in the example shown, so forming a single fuel source. Each of the centre fuel tank 50 and the wing fuel tanks 53 may comprise a plurality of fluidly interconnected fuel tanks. It will be appreciated that this tank arrangement is provided by way of example only, and is not limiting on the scope of this disclosure. In other examples, an aircraft 1 may have only a single fuel tank 50, and/or the wing fuel tanks 53 may be larger than the central fuel tank 50, or no central fuel tank may be provided (with all fuel instead being stored in the aircraft's wings)—it will be appreciated that many different tank layouts are envisaged and that the examples pictured are provided for ease of description and not intended to be limiting. For example, the wing tanks 53a, 53b may be fluidly interconnected with each other, but fluidly isolated from the centre fuel tank 50, providing two separate fuel sources, which may contain chemically distinct fuels.

Figure 5:
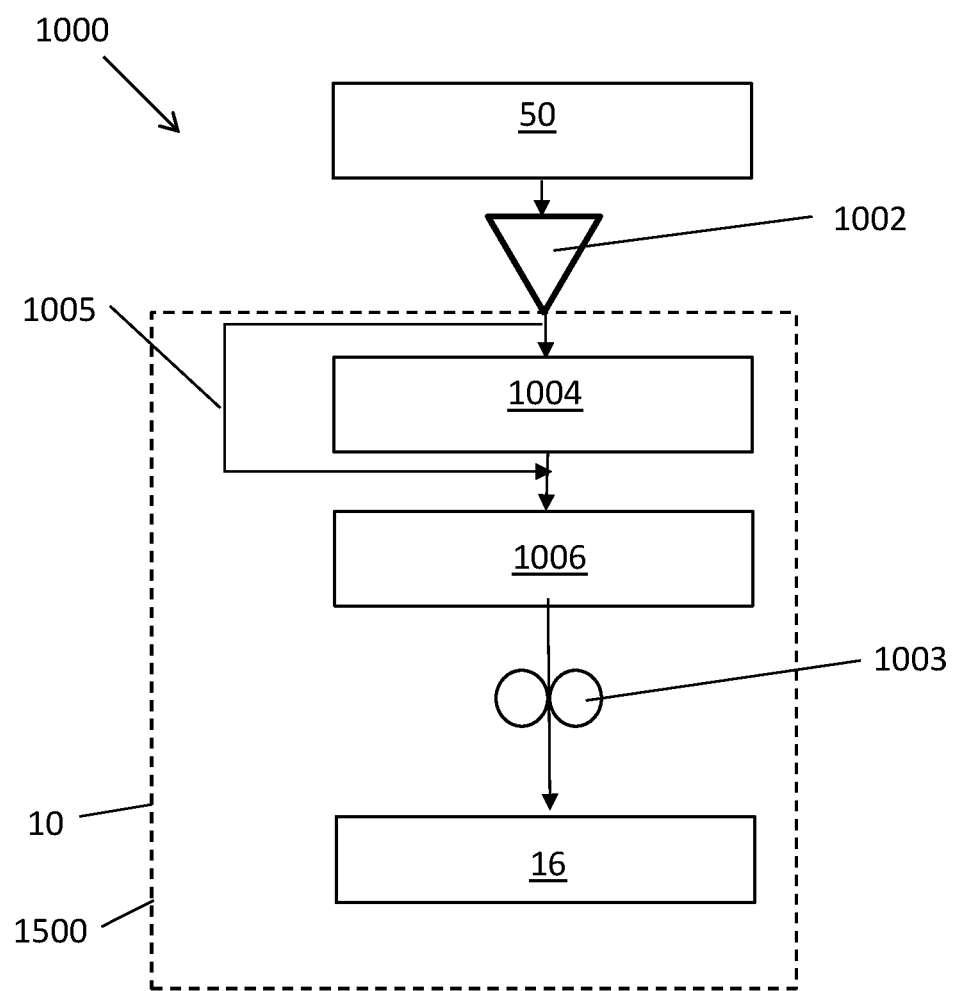
FIG. 5 is a schematic representation of an example fuel system.

An example fuel system 1000 comprising a fuel flow path from the fuel tank 50 to the combustor 16 of the gas turbine engine 10 of the aircraft 1 is shown schematically in FIG. 5. Fuel system 1000 comprises both the fuel supply system 50, 1002 (which supplies fuel to the engine) and the fuel management system 1500 (which operates within the engine) of the aircraft. The fuel management system 1500 manages fuel temperature as well as fuel flow, directing the fuel via one or more heat exchangers 1004, 1006 of the engine's heat exchange system.

Fuel is pumped from the fuel tank 50 to the gas turbine engine 10 by a low pressure fuel supply pump 1002. The fuel then flows through a secondary fuel-oil heat exchanger 1004 and a primary fuel-oil heat exchanger 1006 before passing through an engine fuel pump 1003. The engine fuel pump 1003 may be described as a main fuel pump. The primary fuel-oil heat exchanger 1006 may be described as a main fuel-oil heat exchanger as the oil flowing therethrough may be used to cool and lubricate the main gearbox 30 of the engine 10. The secondary fuel-oil heat exchanger 1004 may be described as an integrated drive generator fuel-oil heat exchanger, as the oil flowing therethrough may be used to cool and/or lubricate an integrated drive generator (IDG) of the engine 10. The fuel management system 1500 pictured is arranged so that the fuel reaches the secondary fuel-oil heat exchanger 1004 before the primary fuel-oil heat exchanger 1006.

The primary fuel-oil heat exchanger 1006 and the secondary fuel-oil heat exchanger 1004 are configured such that a flow of oil is conveyed through each in addition to the flow of fuel therethrough. The primary fuel-oil heat exchanger 1006 and secondary fuel-oil heat exchanger 1004 are configured such that heat may be transferred between the oil and the fuel flowing therethrough. At cruise conditions, the average temperature of the flow of oil entering the primary fuel-oil heat exchanger 1006 is higher than the average temperature of the fuel entering the primary fuel-oil heat exchanger 1006, and the average temperature of the flow of oil entering the secondary fuel-oil heat exchanger 1004 is higher than the average temperature of the fuel entering the secondary fuel-oil heat exchanger 1004. In this way, the primary fuel-oil heat exchanger 1006 and the secondary fuel-oil heat exchanger 1004 are each configured to transfer thermal energy from a flow of oil to a flow of fuel flowing therethrough at cruise conditions.

The primary fuel-oil heat exchanger 1006 may have oil used to lubricate and/or cool a main gearbox 30 of the gas turbine engine 10 passing therethrough, and may therefore be described as a main fuel-oil heat exchanger. The IDG fuel-oil heat exchanger 1004 may have oil used to lubricate and/or cool one or more components of an integrated drive generator 2006 passing therethrough, and may therefore be described as an integrated drive generator fuel-oil heat exchanger.

The two flows of oil may be separate-physically separated and optionally also chemically distinct and/or having a different flow rate. Different oil may therefore flow through the primary fuel-oil heat exchanger 1006 from that flowing through the IDG fuel-oil heat exchanger 1004.

In general, at least the majority of the fuel which passes through the IDG fuel-oil heat exchanger 1004 also passes through the main fuel-oil heat exchanger 1006, although either, or each, heat exchanger 1004, 1006 may be provided with a bypass to allow some of the fuel to avoid passing through the respective heat exchanger, for example in the form of a bypass pipe 1005 as shown in FIG. 5. A valve (not shown) may determine what proportion of the fuel passes through the heat exchanger 1004 and what proportion through the bypass pipe 1005.

The two heat exchangers 1004, 1006 may therefore be described as being in series with each other, with respect to fuel flow. In general, at least the majority of the fuel which passes through the IDG fuel-oil heat exchanger 1004 also passes through the main fuel-oil heat exchanger 1006, although each heat exchanger 1004, 1006 may be provided with a bypass to allow some of the fuel to avoid passing through the respective heat exchanger, for example in the form of a bypass pipe 1005. A valve may determine what proportion of the fuel passes through the heat exchanger 1004 and what proportion through the bypass pipe 1005. Additionally or alternatively, one or more bypass pipes may also be provided to allow oil to bypass one or more heat exchangers.

The IDG fuel-oil heat exchanger 1004 and the main fuel-oil heat exchanger 1006 are configured such that a flow of oil is also conveyed through each—the oil flowing through one is different from the oil flowing through the other in the implementation being described, although it will be appreciated that the same oil may flow through one fuel-oil heat exchanger and then through another fuel-oil heat exchanger in other implementations. In such implementations, one or more bypass pipes for oil or fuel may again be provided to allow the fluid(s) to bypass one or more heat exchangers.

The two heat exchangers 1004, 1006 are therefore in separate closed loop systems 2000, 2000', (FIGS. 7, 8) with respect to oil flow, in the implementation being described, i.e. the oils flowing through the primary and secondary fuel-oil heat exchangers are fluidly separate, and may be chemically distinct from each other.

Figure 6:
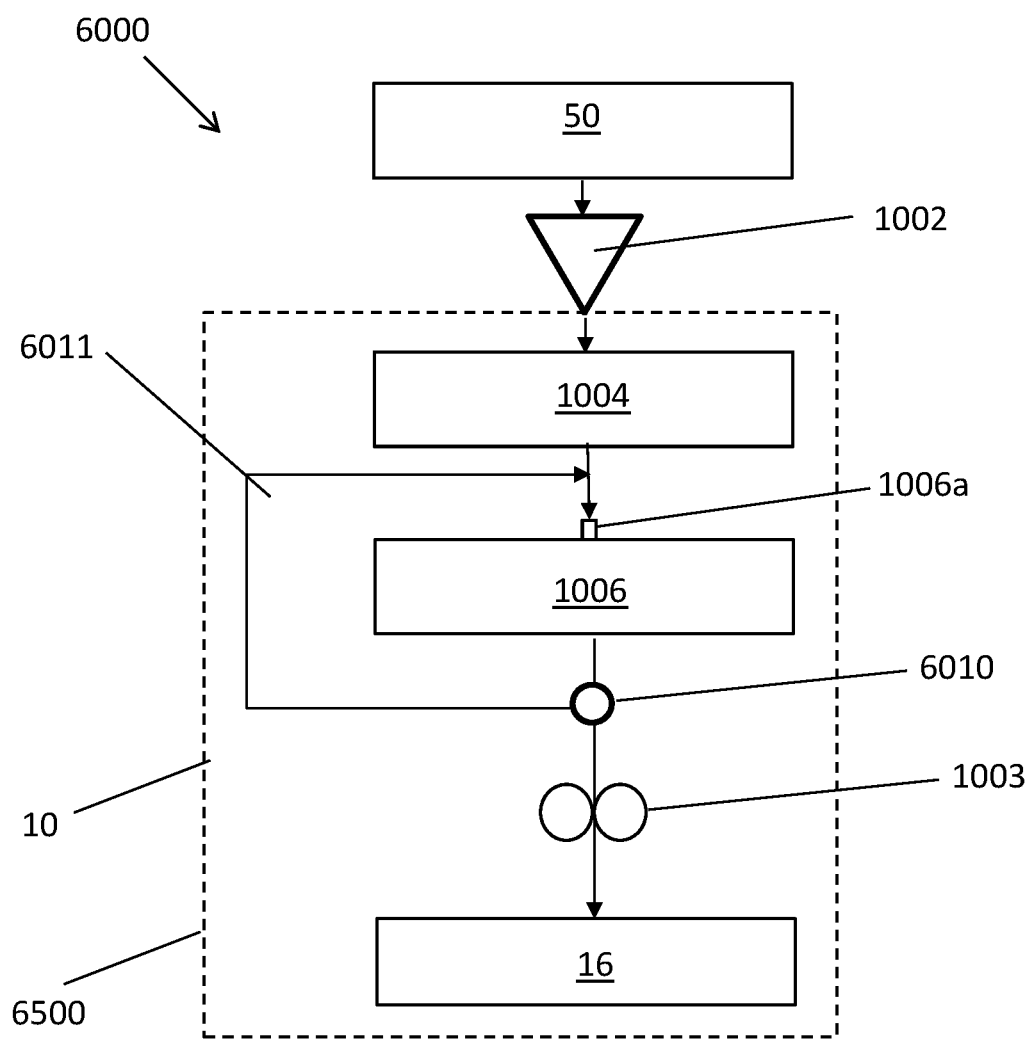
FIG. 6 is a schematic representation of an alternative example fuel system.

FIG. 6 shows an alternative example fuel system 6000, comprising a fuel supply system and fuel management system 6500 comprising a fuel flow path from the fuel tank 50 to the combustor 16 of the gas turbine engine 10 of the aircraft 1. As with fuel system 1000, fuel is pumped from the fuel tank 50 by the low pressure fuel supply pump 1002. The fuel then flows through a secondary fuel-oil heat exchanger 1004 and primary fuel-oil heat exchanger 1006 before reaching an engine fuel pump 1003, which pumps the fuel along its flow path. The engine fuel pump 1003 may be described as a main fuel pump.

Fuel system 6000 differs from fuel system 1000 in that fuel system 6000 comprises a recirculation valve 6010 located downstream of the primary fuel-oil heat exchanger 1006 and arranged to recirculate at least a portion of the fuel which has left the primary fuel-oil heat exchanger back to the inlet 1006*a* of the primary fuel-oil heat exchanger 1006, allowing further heat transfer between the oil of the primary loop system and the fuel. The recirculation valve 6010 may determine what proportion of the fuel is recirculated, and what proportion continues to the combustor 16.

Figure 10:
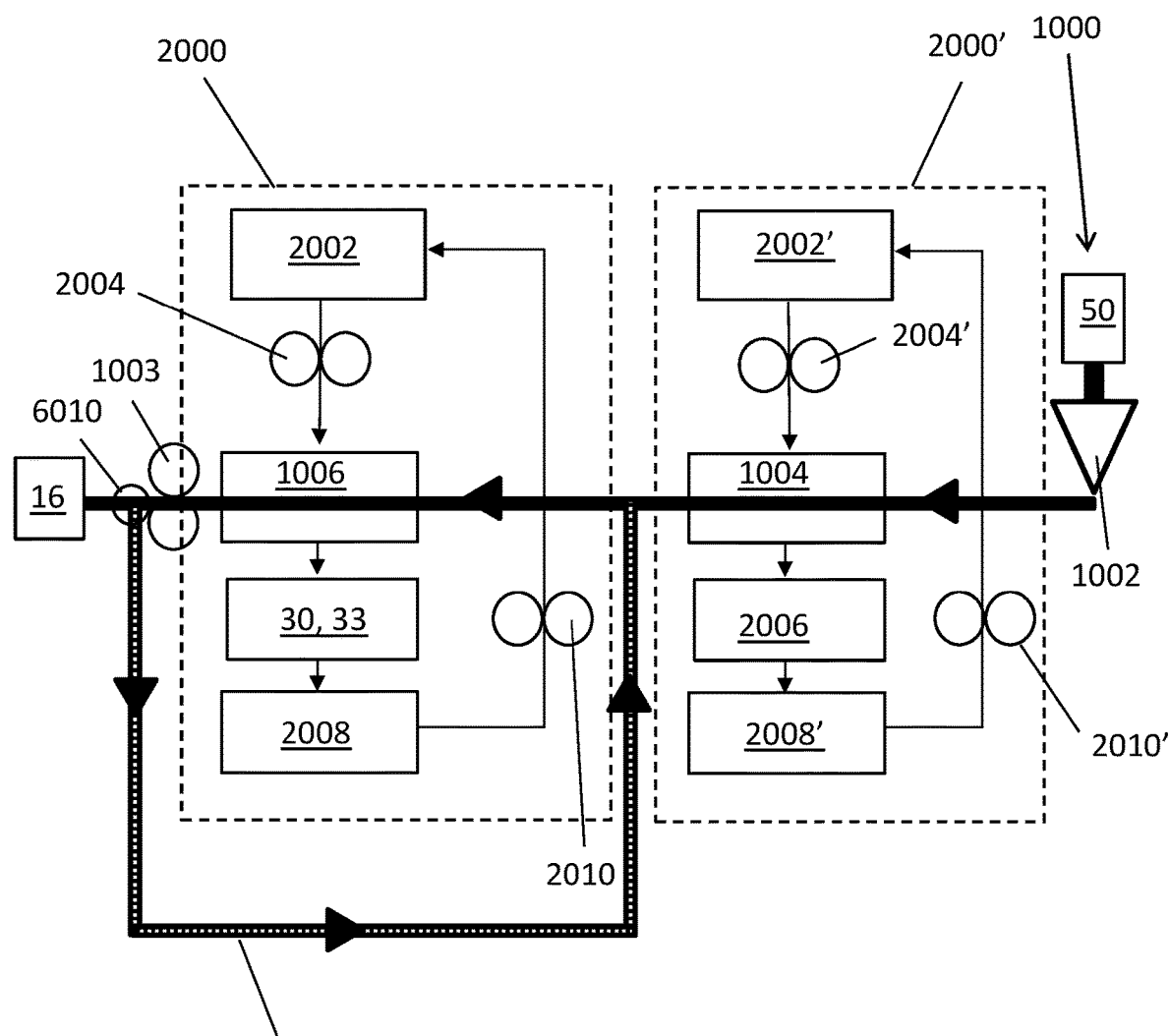
FIG. 10 is a schematic representation of a portion of the example fuel system of FIG. 5 and the example recirculating oil system of FIGS. 7 and 8.

In the illustrated example, the recirculation valve 6010 is located downstream of the primary fuel-oil heat exchanger 1006. In the illustrated example, the recirculation valve 6010 is positioned upstream of the engine fuel pump 1003. The recirculation valve 6010 is arranged to allow a controlled amount of fuel to be returned to the inlet 1006*a* of the primary heat exchanger 1006, so flowing through the primary heat exchanger 1006 multiple times before reaching the pump 1003 and the combustor 16. It is envisaged that the recirculation valve could be positioned downstream of the engine fuel pump 1003 in alternative implementations, for example as shown in FIG. 10. In such implementations, the recirculation valve 6010 would be arranged to allow a controlled amount of fuel to be returned to the inlet 1006*a* of the primary heat exchanger 1006, so flowing through the primary heat exchanger 1006 and the pump 1003 multiple times before reaching the combustor 16

This recirculation provides a mechanism for controlling the fuel flow of the fuel system 6000. Controlling the fuel flow in the fuel system 6000 can work to provide desired characteristics of the fuel (such as temperature, amount of heat transferred thereto, viscosity, and lubricity) on entry to the combustor 16 or pump 1003.

A pipe 6011, which may be referred to as a recirculation pipe as it transports fuel from one point along the main flow-path through the engine to an earlier point along that flow-path so the fuel has to pass through the portion of the flow-path in between again, may therefore be provided, leading from the recirculation valve to a point on the flow-path upstream of the inlet 1006*a* to the primary heat exchanger 1006. In some implementations, a recirculation pipe 6011 and a bypass pipe 1005 may be provided for any given heat exchanger 1004, 1006. In some implementations, the same pipe 1005, 6011 may serve as both a recirculation pipe and a bypass pipe-one or more valves may be used to control the direction of fluid flow therethrough.

In the illustrated example of FIG. 10, unlike that of FIG. 6, the recirculation valve 6010 is located downstream of the pump 1003, such that the recirculated fuel has already passed through both the primary heat exchanger 1006 and the pump 1003, rather than just the primary heat exchanger 1006. The recirculation pipe 6011 returns the recirculated fuel to a point on the flow-path upstream of both the main pump 1003 and the primary heat exchanger 1006, such that the recirculated fuel passes through both of those components an additional time. Recirculating fuel through the pump may allow for more adjustable control of fuel flow rate to the combustor 16 for a given shaft speed of the engine 10, noting that pump speed (or a limited group of pump speed options) is often set by shaft speed. For example, if a required combustion rate of fuel to maintain a current aircraft thrust is lower than the minimum pump speed for the required shaft speed, a larger proportion of fuel may be recirculated through the pump such that the flow rate through the pump is higher than the flow rate to the combustor 16, so reducing or avoiding fuel wastage.

The gas turbine engine 10 of the aircraft 1 also comprises a recirculating oil system arranged to supply oil to lubricate and remove heat from a plurality of components. The recirculating oil system comprises a primary oil loop system 2000 which is a closed loop oil system. An example of such a primary closed loop oil system 2000 is shown schematically in FIG. 7.

The primary closed loop oil system 2000 comprises an oil tank 2002 suitable for containing a volume of oil. In some implementations, gasses are removed from oil within the oil tank 2002 by a de-aerator.

A feed pump 2004 is configured to pump oil from the oil tank 2000 to the main fuel-oil heat exchanger 1006. The average temperature of the oil entering the main fuel-oil heat exchanger 1006, at cruise conditions, is higher than the average temperature of fuel entering the main fuel-oil heat exchanger 1006. In the main fuel-oil heat exchanger 1006, thermal energy is transferred from the flow of oil to the flow of fuel. In this way, the average temperature of the flow of oil leaving the main fuel-oil heat exchanger 1006 is lower than the average temperature of the flow of oil entering the main fuel-oil heat exchanger 1006, so it is cooled before re-use as a lubricant and/or coolant, allowing the cooled oil to remove more heat from the system to be lubricated and/or cooled. Also in this way, the average temperature of the fuel leaving the main fuel-oil heat exchanger 1006 is higher than the average temperature of fuel entering the main fuel-oil heat exchanger 1006.

The flow of oil is then conveyed to a power gearbox 30, which may also be described as a main gearbox 30 of the gas turbine engine 10. The power gearbox 30 is arranged to receive an input from the core shaft 26 and to output drive to the fan 23 via the fan shaft 42 and comprises gears 28, 32, 38 and bearings (e.g. journal bearings) which may be lubricated and cooled by the oil. The engine 10 may also comprise one or more additional bearings to support the shafts 26, 42, which may be journal bearings. The oil may additionally be used to lubricate and/or cool the journal bearings, and generally increases in temperature significantly in use at cruise conditions, so assisting with cooling the bearings and gearbox 30 as the flow of oil transports heat away from the bearings and gearbox 30. The oil may also be used to lubricate one or more further engine components 33, e.g. an auxiliary gearbox (AGB) and/or one or more bearing chambers. The AGB 33, also known as an accessory drive, where present, is a gearbox that forms part of the gas turbine engine 10, although is not a part of the engine's core 11 and does not drive the fan 23. The AGB instead drives the engine accessories, e.g. fuel pumps, and generally handles large loads. A relatively large amount of heat may therefore be dumped into the oil from the AGB. One or more bearing chambers may be lubricated by the same oil, and may similarly dump heat into the oil. Per unit of oil flowing therethrough, the AGB and bearing chambers may add more heat to the oil than the main gearbox 30 does in many implementations.

The flow of oil may be split into two or more parallel flows, for example one flow through the main gearbox 30 and one flow through the other engine components, or multiple parallel flows through the main gearbox 30 (e.g. via different components of the gearbox) and separate flows through the AGB and the or each bearing chamber 33.

From the power gearbox 30 (and/or other engine components 33 such as the AGB, where present), the oil collects in a sump 2008. A scavenge pump 2010 is configured to pump oil from the sump 2008 back into the oil tank 2002, ready for re-use.

Figure 8:
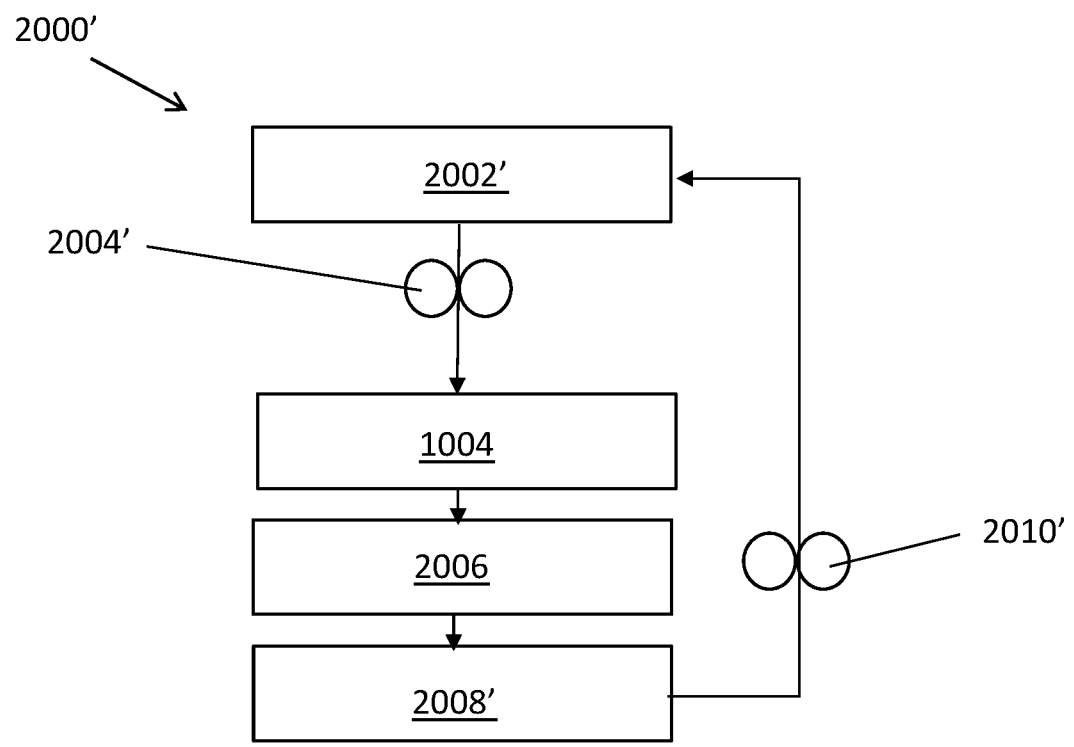
FIG. 8 is a schematic representation of a further portion of an example recirculating oil system.

FIG. 8 illustrates the secondary oil loop system 2000', which is a closed loop oil system 2000'. The secondary closed loop oil system 2000' comprises a secondary oil tank 2002' suitable for containing a volume of oil. In some implementations, gasses are removed from oil within the oil tank 2002' by a de-aerator.

A secondary feed pump 2004' is configured to pump oil from the secondary oil tank 2002' to the IDG fuel-oil heat exchanger 1004. The average temperature of the oil entering the IDG fuel-oil heat exchanger 1004, at cruise conditions, is higher than the average temperature of fuel entering the IDG fuel-oil heat exchanger 1004. In the IDG fuel-oil heat exchanger 1004, thermal energy is transferred from the flow of oil to the flow of fuel. In this way, the average temperature of the flow of oil leaving the IDG fuel-oil heat exchanger 1004 is lower than the average temperature of the flow of oil entering IDG fuel-oil heat exchanger 1004. Also in this way, the average temperature of the fuel leaving the IDG fuel-oil heat exchanger 1004 is higher than the average temperature of fuel entering the IDG fuel-oil heat exchanger 1004.

The flow of oil is then conveyed to/back to an integrated drive generator 2006, where it lubricates and/or cools moving components and is heated up in the process. In some implementations, the oil may be used primarily as a coolant for the IDG 2006, and may do minimal or no lubrication.

From the integrated drive generator 2006, the oil collects in a secondary sump 2008'. A secondary scavenge pump 2010' is configured to pump oil from the secondary sump 2008' back into the secondary oil tank 2002', ready for re-use.

Figure 7:
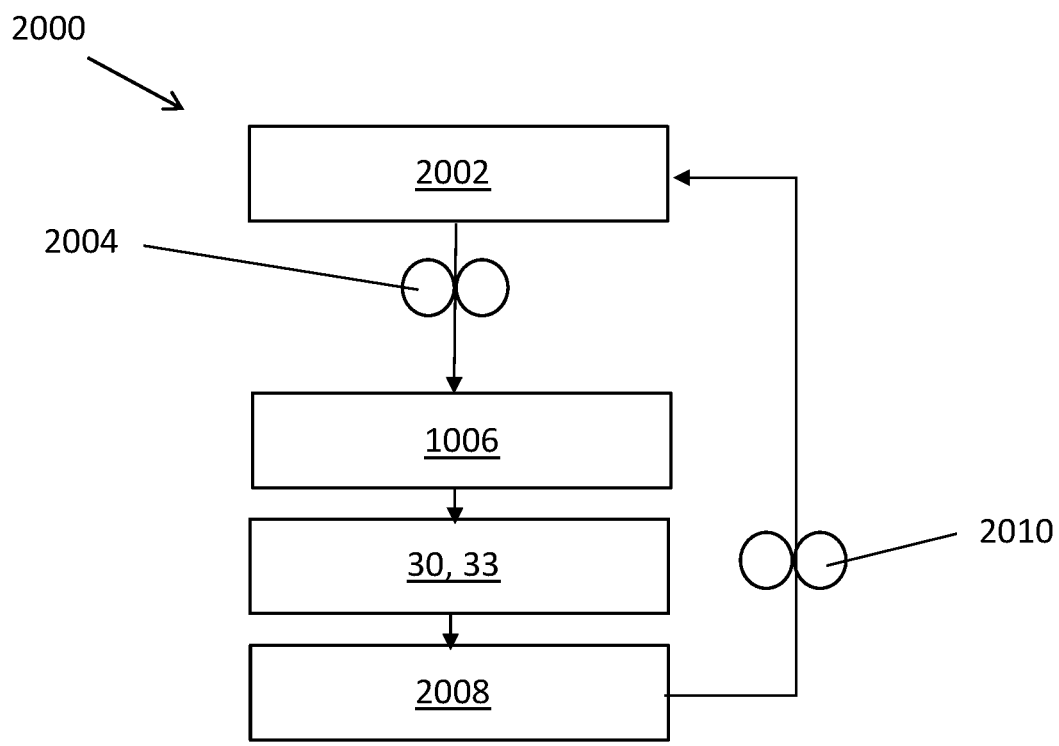
FIG. 7 is a schematic representation of a portion of an example recirculating oil system.
Figure 9:
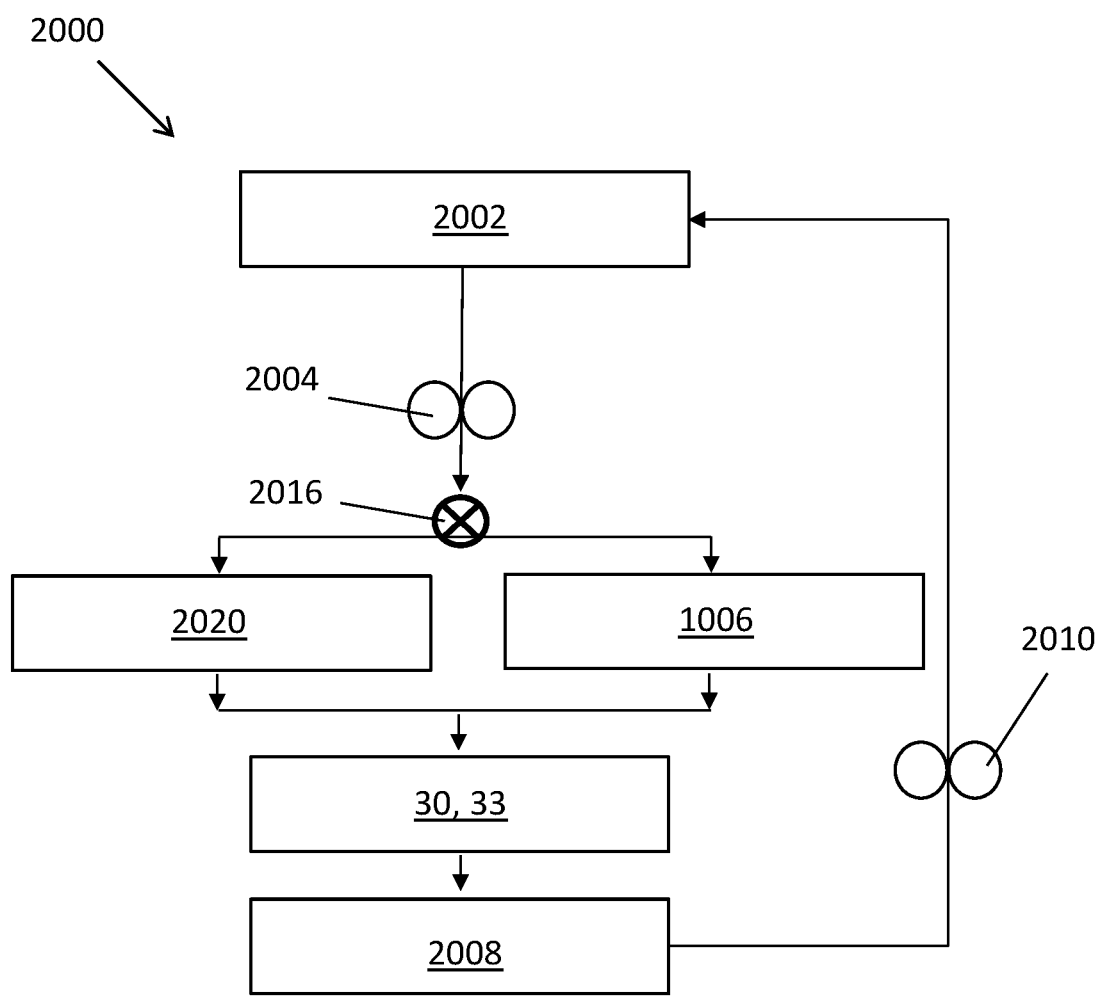
FIG. 9 is a schematic representation of a portion of an alternative example recirculating oil system.

FIG. 9 shows schematically an alternative example section of the primary closed loop oil system 2000 shown in FIG. 7. In this section a flow of oil is pumped by the feed pump 2004 through a valve 2016. The valve 2016 is operable to divert the flow of oil to both the main fuel-oil heat exchanger 1006 and a first air-oil heat exchanger 2020, where the first air-oil heat exchanger 2020 is arranged in parallel with the main fuel-oil heat exchanger 1006. The oil flow path may be described as branching, with the main fuel-oil heat exchanger 1006 on one branch and the first air-oil heat exchanger 2020 on the other branch, in a parallel configuration such that oil can flow via one branch or the other, but the same portion of oil cannot pass through both on the same cycle—the flow splits. The flows of oil are then recombined and conveyed to the power gearbox 30 and/or other engine components 33. Any suitable percentage of oil may flow through each of the first air-oil heat exchanger 2020 and the main fuel-oil heat exchanger 1006. In some examples, the valve 2016 is operable to vary the flow of oil to the main fuel-oil heat exchanger 1006 and the first air-oil heat exchanger 2020. In various examples, an oil-oil heat exchanger (not shown) may be provided, for example being arranged in series with the first air-oil heat exchanger 2020 on that branch of the parallel split. The oil-oil heat exchanger may allow for heat exchange between the primary and secondary closed loop oil systems.

FIG. 10 shows schematically an example arrangement and interaction of the first closed loop oil system 2000, second closed loop oil system 2000' and fuel system 1000, with fuel flow shown in thick black lines and oil flow in thinner black lines. The striped thick black line indicates a recirculation path 6011 taken by only a portion of the fuel.

The primary closed loop oil system 2000 of this example arrangement is arranged as shown in FIG. 7. The secondary closed loop oil system 2000' of this example arrangement is arranged as shown in FIG. 8. The fuel system 1000 of this example arrangement is arranged as shown in FIG. 5, but with an additional recirculation valve 6010 and pipe 6011 as described above. A bypass pipe 1005 may also be present, but is not shown for clarity.

In use, fuel is pumped from the fuel tank 50 by the low pressure fuel pump 1002. The fuel then flows through the IDG fuel-oil heat exchanger 1004. The secondary closed loop oil system 2000' is configured such that its recirculating flow of oil also flows through the IDG fuel-oil heat exchanger 1004.

At cruise conditions, the average temperature of the flow of oil entering the IDG fuel-oil heat exchanger 1004 is higher than the average temperature of the flow of fuel entering the IDG fuel-oil heat exchanger 1004. The IDG fuel-oil heat exchanger 1004 is configured such that heat is transferred from the flow of oil to the flow of fuel. In this way, the average temperature of the flow of oil on exit from the IDG fuel-oil heat exchanger 1004 is lower than the average temperature of the flow of oil on entry to the IDG fuel-oil heat exchanger 1004. In the same way, the average temperature of the flow of fuel on exit from the IDG fuel-oil heat exchanger 1004 is higher than the average temperature of the flow of fuel on entry from the IDG fuel-oil heat exchanger 1004.

The fuel then flows through the main fuel-oil heat exchanger 1006. The primary closed loop oil system 2000 is configured such that its recirculating flow of oil also flows through the main fuel-oil heat exchanger 1006.

At cruise conditions, the average temperature of the flow of oil entering the main fuel-oil heat exchanger 1006 is higher than the average temperature of the flow of fuel entering the main fuel-oil heat exchanger 1006. The main fuel-oil heat exchanger 1006 is configured such that heat is transferred from the flow of oil to the flow of fuel. In this way, the average temperature of the flow of oil on exit from the main fuel-oil heat exchanger 1006 is lower than the average temperature of the flow of oil on entry to the main fuel-oil heat exchanger 1006. In the same way, the average temperature of the flow of fuel on exit from the main fuel-oil heat exchanger 1006 is higher than the average temperature on entry from the main fuel-oil heat exchanger 1006.

At cruise conditions, the average temperature of the flow of oil flowing through the IDG fuel-oil heat exchanger 1004 may be lower than the average temperature of the flow of oil flowing through the main fuel-oil heat exchanger 1006. In this way, the fuel passes through the heat exchanger 1004 having a lower average oil flow temperature first, before passing through the heat exchanger 1006 having a higher average oil flow temperature.

After flowing through the main fuel-oil heat exchanger 1006, the fuel flows to the engine fuel pump 1003, which is located downstream of the primary and secondary fuel-oil heat exchangers 1006, 1004 in the examples shown and is arranged to deliver fuel to the combustor 16 of the gas turbine engine 10.

Figure 11:
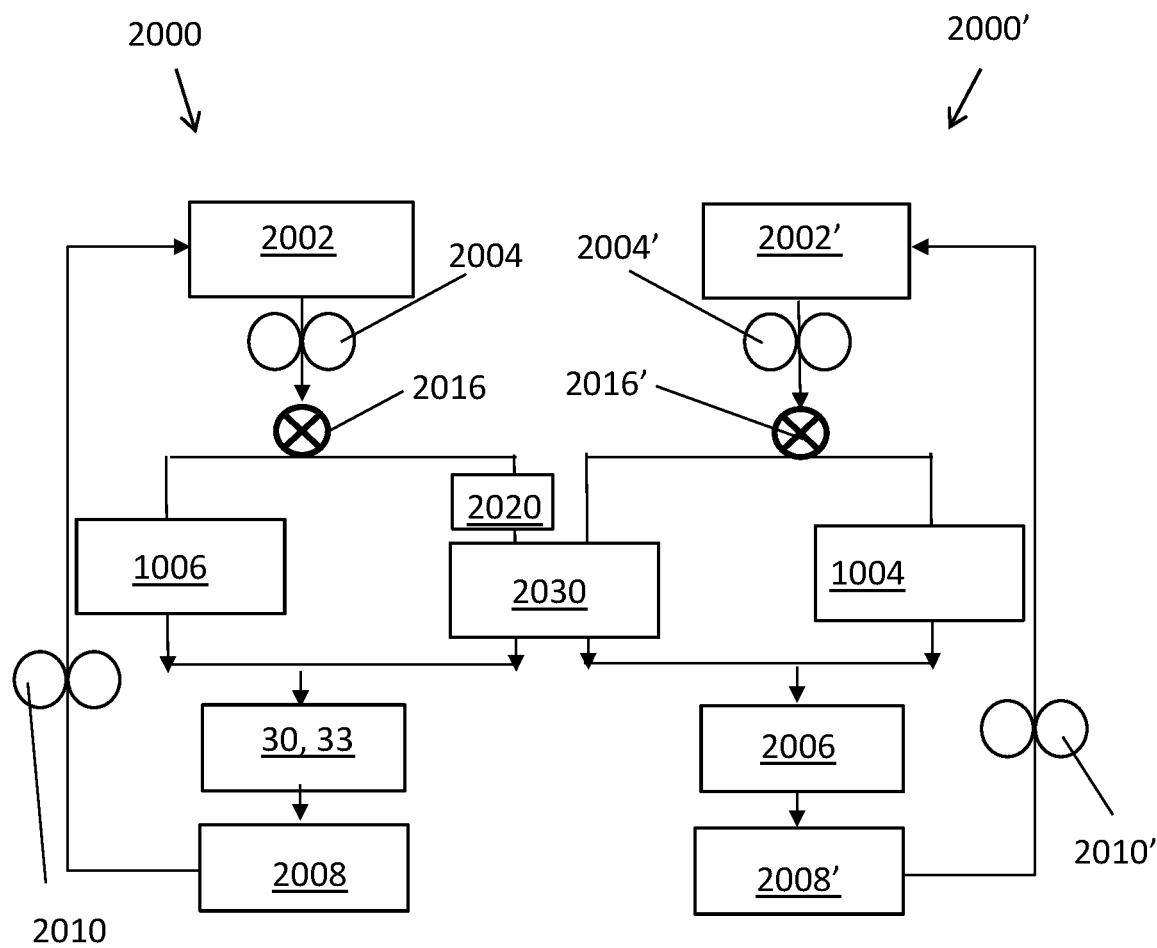
FIG. 11 is a schematic representation of a further alternative example recirculating oil system.

FIG. 11 shows schematically an example configuration of the primary closed loop oil system 2000 and the secondary closed loop oil system 2000' where the two independent recirculating flows of oil are brought into a heat exchange relationship through an oil-oil heat exchanger 2030.

In the example shown in FIG. 11, the primary closed loop oil system 2000 is configured such that the recirculating flow of oil is pumped by the feed pump 2004 through a valve 2016, which may be referred to as a modulation valve. The valve 2016 is operable to split the flow of oil such that a portion of the flow of oil goes to each of the main fuel-oil heat exchanger 1006 and a first air-oil heat exchanger 2020. In the implementation shown, the first air-oil heat exchanger 2020 is in series with the oil-oil heat exchanger 2030, and the air-oil 2020 and oil-oil heat exchanger 2030 arrangement is in parallel with the main fuel-oil heat exchanger 1006. The modulation valve 2016 determines what proportion of the oil travels through each branch of the parallel arrangement.

In examples, any suitable portion of the flow of oil may be diverted between the main fuel-oil heat exchanger 1006 and the first air-oil heat exchanger 2020. In examples, the valve 2016 is operable to divert a fixed portion of the flow of oil to each of the main fuel-oil heat exchanger 1006 and the first air-oil heat exchanger 2020. In other examples, the valve 2016 is operable to divert a variable portion of the flow of oil to each of the main fuel-oil heat exchanger 1006 and the first air-oil heat exchanger 2020, for example using data from a temperature sensor for feedback to control the variable portion.

After flowing through the heat exchangers 1006, 2020, 2030, the flow of oil in the primary closed loop system 2000 is then recombined and conveyed to the power gearbox 30 (and/or other engine components 33 such as the AGB) and then to the sump 2008. The scavenge pump 2010 then pumps the oil from the sump 2008 to the oil tank 2002, for re-use.

The flow of oil within the secondary closed loop oil system 2000' is arranged to be brought into a heat exchange relationship with the separate flow of oil within the primary closed loop oil system 2000 through the oil-oil heat exchanger 2030. In the oil-oil heat exchanger 2030 the flow of oil within the primary closed loop oil system 2000 does not mix with the flow of oil within the secondary closed loop oil system 2000'. The oil-oil heat exchanger 2030 is configured such that a transfer of heat may take place between the two separated flows of oil. In this way, heat from a hotter flow of oil may be transferred to the cooler flow of oil within the oil-oil heat exchanger 2030.

In the implementation shown in FIG. 11, the secondary closed loop oil system 2000' is configured such that the recirculating flow of oil is pumped by the secondary feed pump 2004' through a valve 2016', which may be referred to as a secondary modulation valve. The valve 2016' is operable to divert at least a portion of the flow of oil between the IDG fuel-oil heat exchanger 1004 and the oil-oil heat exchanger 2030, where the oil-oil heat exchanger 2030 is arranged in parallel with the IDG fuel-oil heat exchanger 1004. In other implementations, the secondary closed loop oil system 2000' may not have a branched configuration. For example, the IDG fuel-oil heat exchanger 1004 and the oil-oil heat exchanger 2030 may be arranged in series such that at least a majority of the oil passing through one also passes through the other in a given cycle.

In other implementations, an air-oil heat exchanger 2020 may be present on each closed-loop system, or only on the secondary closed loop system, and/or no oil-oil heat exchanger may be present.

In examples, any suitable portion of the flow of oil may be diverted between the IDG fuel-oil heat exchanger 1004 and the oil-oil heat exchanger 2030. In examples, the valve 2016' is operable to divert a fixed portion of the flow of oil to each of the IDG fuel-oil heat exchanger 1004 and the oil-oil heat exchanger 2030. In examples, the valve 2016' is operable to divert a variable portion of the flow of oil to each of the IDG fuel-oil heat exchanger 1004 and the oil-oil heat exchanger 2030.

After flowing through the heat exchangers 1004, 2030, the flow of oil is then conveyed to the integrated drive generator 2006 and then to the secondary sump 2008'. The secondary scavenge pump 2010' then pumps the oil from the secondary sump 2008' to the secondary oil tank 2002', for re-use.

One or more temperature sensors may therefore be provided, for example arranged to sense fuel temperature on approach to the fuel pump 1003 or the combustor 16. Data from the one or more sensors may be used by a controller of the heat exchange system to manage fuel and/or oil flows through and around the heat exchangers. The control may be automated.

The inventors appreciated that careful selection and control of fuel based on parameters such as viscosity and temperature can affect combustion efficiency, in particular with respect to fuel nozzle spray performance within the combustor, and/or improve component longevity. Using the fuel to take more heat from the oil, rather than relying on heat transfer from the oil to the environment/air (e.g., in the air-oil heat exchanger) may provide a more thermally efficient engine, as described above.

Figure 12:
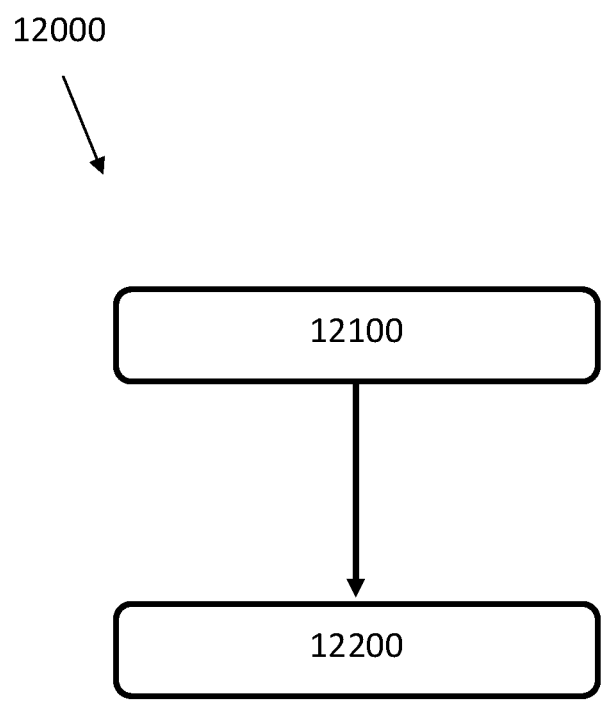
FIG. 12 illustrates an example method of operating a gas turbine engine.

FIG. 12 illustrates an example method 12000 of operating a gas turbine engine 10. The method 12000 comprises the steps of:

Step 12100: Providing a fuel to the combustor 16 of the gas turbine engine 10 via a fuel management system 1500.

The gas turbine engine 10 comprises a heat exchange system comprising at least two heat exchangers, and optionally more, as described above Step 12200: Controlling the heat exchange system so as to raise the fuel temperature to at least 135° C. on entry to the combustor at cruise conditions.

In various implementations as discussed above, the controlling 12200 the heat exchange system may comprise controlling fuel flow through the primary and secondary fuel-oil heat exchangers 1006, 1004.

Fuel flow may be controlled using a recirculation valve 6010 where present, as in fuel management system 6500. An actively controlled amount of fuel leaving the primary heat exchanger 1006 may be recirculated to the primary heat exchanger 1006 rather than flowing directly to the combustor 16. This recirculation may also take fuel which has already passed through the engine fuel pump 1003 back to a position upstream of the engine fuel pump 1003.

Alternatively or additionally, fuel flow may be controlled by using one or more bypass pipes 1005 arranged to allow a proportion of the fuel to avoid passing through either or both fuel-oil heat exchangers.

The speed of the pump 1003 may also be adjusted, either speeding up fuel flow rate (so reducing heat transfer per unit volume passing through the heat exchangers) or reducing fuel flow rate (so increasing heat transfer per unit volume passing through the heat exchangers).

The controlling 12200 the heat exchange system may comprise controlling oil flow through the primary and secondary fuel-oil heat exchangers 1006, 1004 and/or through one or more other heat exchangers—e.g. an oil-oil heat exchanger 2030 between separate closed loop oil systems or an air-oil heat exchanger 2020.

Additionally or alternatively, as for fuel flow, oil flow may be controlled using one or more bypass pipes, where present, allowing oil to bypass one or more heat exchangers 1004, 1006 instead of flowing therethrough. Oil may also be recirculated in some implementations and/or oil flow rate may be adjusted by controlling one or more oil pumps. One or more controllable valves, pumps, and/or sensors may be provided accordingly to facilitate oil flow control.

The heat exchange system may comprise a controller arranged to implement this control (of fuel flow and/or oil flow). The controller may receive inputs from one or more temperature sensors, and may control one or more valves (e.g. recirculation valve 6010), and/or the pump 1003, based on the received data. One or more oil feed pumps and/or scavenge pumps may also be controlled by the controller.

This active control may be performed based on one or more parameters such as:

Core shaft speed and engine thrust demand;
Current fuel temperature and/or oil temperature at one or more locations;
Fuel calorific value;
Fan rotational speed;
Fuel flow rate to the combustor (commonly referred to as WFE—Weight of Main Engine Fuel Flow);
Fuel viscosity; and
Main/engine fuel pump speed, or speed options.

In alternative examples, the control of the amount of fuel leaving the primary fuel-oil heat exchanger 1006 to be recirculated may not be an active method step-instead, a set, fixed, proportion of the fuel may be recirculated. Alternatively, no fuel may be recirculated, and no recirculation route may be available in some implementations.

The inventors also appreciated that careful control of heat transfer from oil into the fuel might allow more efficient use to be made of newer fuels, adjusting parameters at cruise conditions to improve combustion efficiency and/or improve component longevity, and allow for more efficient oil cooling as discussed above.

Figure 13:
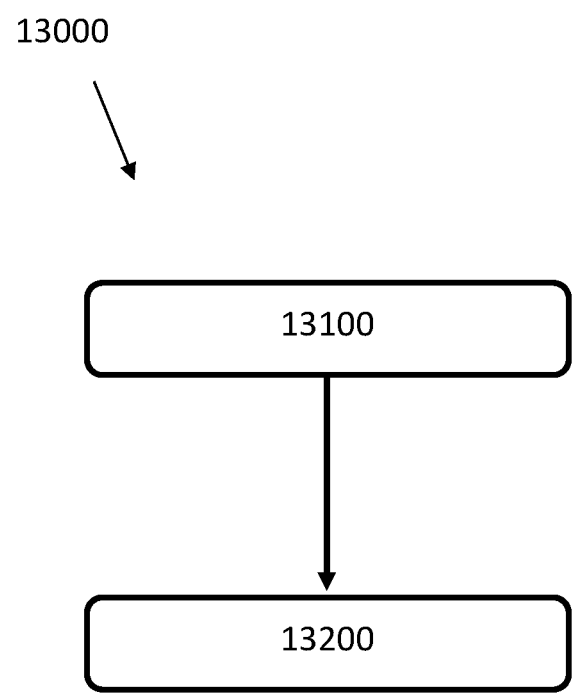
FIG. 13 illustrates a further example method of operating a gas turbine engine.

FIG. 13 illustrates an example method 13000 of operating a gas turbine engine 10. The method 13000 comprises the steps of:

Step 13100: Providing a fuel to the combustor 16 of the gas turbine engine 10 via a fuel management system 1500.

The gas turbine engine 10 comprises a heat exchange system comprising at least two heat exchangers 1006, 1004, and optionally more, as described above Step 13200: Controlling the heat exchange system so as to transfer between 200 and 600 kJ/m$^3$ of heat from the oil to the fuel at cruise conditions, optionally in one or more fuel-oil heat exchangers.

In various implementations as discussed above, the controlling 13200 the heat exchange system may comprise controlling fuel flow through the primary and secondary fuel-oil heat exchangers 1006, 1004.

Control of the heat exchange system may be or comprise substantially the same control mechanisms as discussed with respect to step 12200 of the method 12000 of FIG. 12.

The method of FIG. 13 may be used in conjunction with the method of FIG. 12.

The inventors appreciated that careful selection and control of fuel based on parameters such as viscosity and temperature can affect combustion efficiency, in particular with respect to fuel nozzle spray performance within the combustor (e.g. droplet size and distribution), and/or improve component longevity (e.g. by reducing creep and/or damage due to differing thermal expansion coefficients of components on thermal cycling in use, and reducing deposition of thermal decomposition products of the fuel within the pump which can result in blockages, so resulting in deterioration in delivery flow over the life of the pump). Using the fuel to take more heat from the oil, rather than relying on heat transfer from the oil to the environment/air (e.g., in the air-oil heat exchanger) provides a more thermally efficient turbine engine 10. The reduced maximum temperature to which the pump is exposed may reduce creep, reduce thermal damage to components such as seals, and/or reduce damage over cycling resulting from different thermal expansions of different pump components, so extending pump life/improving pump performance for a given pump age. In addition, bearing film thickness in the pump 1003 may be improved if temperatures of fuel in the pump are kept lower by placing the pump before a further heat exchanger. Fuel is the lubricant for the pump bearings, and fuel viscosity generally reduces as temperature increases, so deleteriously reducing film thickness. Reducing the fuel temperature may result in an increase in the viscosity of the fuel, which generally enhances the performance of the bearing surfaces inside the pump 1003, so reducing wear and hence reducing deterioration in flow delivery with time. Careful control of fuel viscosity can therefore improve pump performance, and potentially improve pump longevity. For example, a less viscous fuel may require less force from the pump 1003 for the same fuel flow rate, so potentially reducing wear on the pump, but this is offset by the reduced film thickness so a balance should be struck. In addition, lower fuel temperatures generally reduce the formation of fuel breakdown products which also have a detrimental effect on the life and reliability of the pump 1003. The lower fuel temperature may therefore also increase reliability. The lower temperature may also reduce damage to journal bearings and thrust bearings.

Other relevant factors include variation in cavitation (cooler fuel is denser and has a lower vapour pressure) and lubricity; cooler fuel is beneficial from the volumetric pump output perspective, so a pump 1003 may be kept on-wing longer/may have a longer useful lifespan if used with cooler fuel. However, increasing the fuel temperature may provide benefits such as improved combustion in some implementations, and a suitable balance may therefore be selected-heat exchange between oil and fuel may therefore be adjusted as appropriate to achieve the desired characteristics at cruise.

Fuel nozzle spray performance (e.g. droplet size and distribution as mentioned above, both of which are affected by viscosity) affects burn efficiency of the fuel, so engine efficiency can be improved with the selection of desired viscosity.

Figure 14:
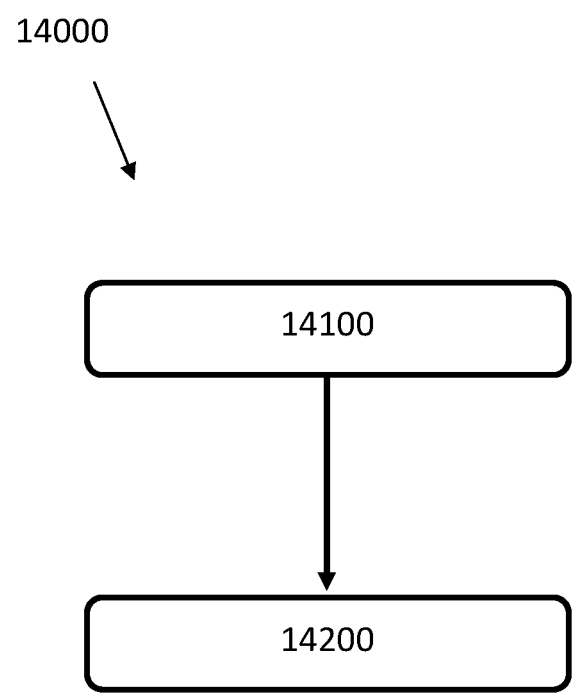
FIG. 14 illustrates a further example method of operating a gas turbine engine.

FIG. 14 illustrates an example method 14000 of operating a gas turbine engine 10. The method 14000 comprises the steps of:

Step 14100: Providing a fuel to the combustor 16 of the gas turbine engine 10 via a fuel management system 1500.

The gas turbine engine 10 comprises a heat exchange system comprising at least two heat exchangers 1006, 1004, and optionally more, as described above.

Step 14200: Controlling the heat exchange system so as to adjust the fuel viscosity to a maximum of 0.58 mm$^2$/s on entry to the combustor at cruise conditions.

Step 14200 may also be described as transferring 14200 heat from the oil to the fuel, using the heat exchange system 1004, 1006, so as to lower the fuel viscosity to a value below or equal to 0.58 mm$^2$/s on entry to the combustor 16 at cruise conditions.

A lower maximum threshold on viscosity may be set in different implementations. Viscosity may also be controlled so as not to drop below a specified minimum.

In various implementations as discussed above, the controlling 14200 the heat exchange system may comprise controlling fuel flow through the primary and secondary fuel-oil heat exchangers 1006, 1004.

Control 14200 of the heat exchange system may be or comprise substantially the same control mechanisms as discussed with respect to step 12200 of the method 12000.

The method of FIG. 14 may be used in conjunction with the method of FIG. 12 and/or the method of FIG. 13.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of operating a gas turbine engine, the gas turbine engine comprising:
    an engine core comprising a turbine, a compressor, a combustor arranged to combust a fuel, and a core shaft connecting the turbine to the compressor;
    a fan located upstream of the engine core;
    a fan shaft;
    a gearbox that receives an input from the core shaft and outputs drive to the fan via the fan shaft;
    a primary oil loop system arranged to supply oil to the gearbox;
    a heat exchange system comprising:
        an air-oil heat exchanger through which oil in the primary oil loop system flows; and
        a fuel-oil heat exchanger through which the oil in the primary oil loop system and the fuel flow such that heat is transferred between the oil and the fuel, and wherein the primary oil loop system branches such that a proportion of the oil can flow along each branch and the air-oil and fuel-oil heat exchangers are arranged in a parallel configuration on different branches of the primary oil loop system; and
    a modulation valve arranged to allow the proportion of oil sent via each branch to be varied,
    wherein the method comprises controlling the heat exchange system so as to transfer between 200 and 600 KJ/m$^3$ of heat from the oil to the fuel at cruise conditions, wherein
    the gas turbine engine further comprises:
        an integrated drive generator; and
        a secondary oil loop system arranged to provide oil to the integrated drive generator;
    the heat exchange system further comprises:
        a secondary fuel-oil heat exchanger arranged to receive the fuel and oil from the secondary oil loop system; and
    the method comprises transferring heat between the oil from the secondary oil loop system and the fuel using the secondary fuel-oil heat exchanger.

2. The method of claim 1, comprising transferring between 300 and 500 KJ/m$^3$ of heat from the oil to the fuel in the fuel-oil heat exchanger at cruise conditions.

3. The method of claim 1, comprising transferring between 350 and 450 KJ/m$^3$ of heat from the oil to the fuel in the fuel-oil heat exchanger at cruise conditions.

4. The method of claim 1, wherein:
    at least 50% of the heat transferred from the oil of the primary oil loop system is transferred to the fuel by the fuel-oil heat exchanger.

5. The method of claim 1, wherein:
    approximately 60% of the heat transferred from the oil of the primary oil loop system is transferred to the fuel by the fuel-oil heat exchanger.

6. The method of claim 1, wherein
    the heat exchange system comprises an oil-oil heat exchanger arranged to transfer heat between the oil of the primary oil loop system and the oil of the secondary oil loop system.

7. The method of claim 6, wherein the oil-oil heat exchanger is downstream of the air-oil and fuel-oil heat exchangers of the primary oil system.

8. The method of claim 6, wherein the primary oil loop system comprises two branches through which oil flows, to provide the parallel heat exchanger configuration, and wherein the oil-oil heat exchanger is on the same branch as the air-oil heat exchanger.

9. The method of claim 1, wherein:
the fuel-oil heat exchanger through which oil of the primary oil system flows is a primary fuel-oil heat exchanger; and
the fuel flows through the secondary fuel-oil heat exchanger prior to flowing through the primary fuel-oil heat exchanger, such that heat is transferred from the oil in the secondary oil loop system to the fuel before heat is transferred from the oil in the primary oil system to the fuel.

10. The method of claim 1, wherein the controlling the heat exchange system so as to transfer heat from the oil to the fuel at cruise conditions comprises adjusting an amount of fuel sent through at least one of the primary fuel-oil heat exchanger and the secondary fuel-oil heat exchanger.

11. The method of claim 1, wherein the heat exchange system comprises at least one bypass pipe arranged to allow fuel to bypass a heat exchanger of the heat exchange system, and wherein the method comprises adjusting the amount of fuel sent through the bypass pipe based on fuel temperature.

12. A gas turbine engine for an aircraft comprising:
an engine core comprising a turbine, a compressor, a combustor arranged to combust a fuel, and a core shaft connecting the turbine to the compressor;
a fan located upstream of the engine core, the fan comprising a plurality of fan blades;
a gearbox that is arranged to receive an input from the core shaft and output drive to the fan so as to drive the fan at a lower rotational speed than the core shaft;
a primary oil loop system arranged to supply oil to the gearbox;
a heat exchange system comprising:
an air-oil heat exchanger through which oil in the primary oil loop system flows; and
a fuel-oil heat exchanger through which the oil in the primary oil loop system and the fuel flow such that heat is transferred between the oil and the fuel, and wherein the primary oil loop system branches such that a proportion of the oil can flow along each branch and the air-oil and fuel-oil heat exchangers are arranged in a parallel configuration on different branches of the primary oil loop system; and
a modulation valve arranged to allow the proportion of oil sent via each branch to be varied, wherein:
the heat exchange system is arranged to transfer between 200 and 600 KJ/m$^3$ of heat from the oil to the fuel at cruise conditions,
the gas turbine engine further comprises:
an integrated drive generator; and
a secondary oil loop system arranged to provide oil to the integrated drive generator, and
the heat exchange system further comprises:
a secondary fuel-oil heat exchanger arranged to receive oil from the secondary oil loop system, wherein the secondary fuel-oil heat exchanger is arranged to transfer heat between the oil from the secondary oil loop system and the fuel.

13. The gas turbine engine of claim 12, wherein the heat exchange system is arranged to transfer between 300 and 500 KJ/m$^3$ of heat from the oil to the fuel through the heat exchange system at cruise conditions.

14. The gas turbine engine of claim 12, wherein the heat exchange system is arranged such that at least 50% of the heat transferred from the oil of the primary oil loop system is transferred to the fuel by the fuel-oil heat exchanger.

15. The gas turbine engine of claim 12,
wherein the heat exchange system comprises an oil-oil heat exchanger arranged to transfer heat between the oil of the primary oil loop system and the oil of the secondary oil loop system.

16. The gas turbine engine of claim 15, wherein the oil-oil heat exchanger is positioned downstream of the air-oil and fuel-oil heat exchangers of the primary oil loop system.

17. The gas turbine engine of claim 15, wherein the oil-oil heat exchanger is positioned on the same branch as the air-oil heat exchanger.

18. The gas turbine engine of claim 12, wherein:
the fuel-oil heat exchanger through which oil of the primary oil loop system flows is a primary fuel-oil heat exchanger; and
the heat exchange system is arranged such that fuel flows through the secondary fuel-oil heat exchanger prior to flowing through the primary fuel-oil heat exchanger, such that heat is transferred from the oil in the secondary oil loop system to the fuel before heat is transferred from the oil in the primary oil loop system to the fuel.

\* \* \* \* \*